US00RE38368E

(19) United States
(12) Reissued Patent
Bishop et al.

(10) Patent Number: US RE38,368 E
(45) Date of Reissued Patent: Dec. 30, 2003

(54) STORAGE AND DISPENSING PACKAGE FOR BATTERIES AND OTHER OBJECTS

(75) Inventors: Lewis D. Bishop, West Union, IA (US); Lawrence Bishop, Karlskoga (SE)

(73) Assignee: Northeast Iowa Rehabilitation Agency, West Union, IA (US)

(21) Appl. No.: 10/034,809

(22) Filed: Dec. 28, 2001

Related U.S. Patent Documents

Reissue of:
(64) Patent No.: 6,164,490
Issued: Dec. 26, 2000
Appl. No.: 09/304,126
Filed: May 3, 1999

(51) Int. Cl.[7] ..... B65H 1/00
(52) U.S. Cl. ..... 221/197; 221/212
(58) Field of Search ..... 221/197, 232, 221/268, 270, 253, 212, 281, 1, 277

(56) References Cited

U.S. PATENT DOCUMENTS

| | | | | | |
|---|---|---|---|---|---|
| 2,473,812 | A | * | 6/1949 | Muros | 221/232 |
| 2,812,576 | A | * | 11/1957 | Kuhnl | 221/232 |
| 3,897,265 | A | * | 7/1975 | Jaggard | 429/35 |
| 3,995,767 | A | * | 12/1976 | Brindley et al. | 221/82 |
| 4,015,708 | A | * | 4/1977 | Kelm | 206/704 |
| 4,209,091 | A | * | 6/1980 | Lieberman | 206/704 |
| 4,591,539 | A | * | 5/1986 | Oltman et al. | 429/27 |
| 4,649,090 | A | * | 3/1987 | Oltman et al. | 429/29 |
| 4,696,402 | A | * | 9/1987 | Harmon et al. | 229/120.011 |
| 4,791,034 | A | * | 12/1988 | Dopp | 429/27 |
| 4,860,890 | A | * | 8/1989 | Cerny et al. | 206/704 |
| 4,953,700 | A | * | 9/1990 | DeDino | 206/704 |
| 5,033,616 | A | * | 7/1991 | Wyser | 206/704 |
| 5,117,977 | A | * | 6/1992 | Voroba | 206/704 |
| 5,129,546 | A | * | 7/1992 | Thielmann | 221/66 |
| 5,199,565 | A | * | 4/1993 | Voroba | 206/704 |
| 5,203,455 | A | * | 4/1993 | Hewelt et al. | 206/704 |
| 5,308,711 | A | * | 5/1994 | Passaniti et al. | 429/29 |
| 5,647,507 | A | * | 7/1997 | Kasper | 221/151 |
| 5,795,667 | A | * | 8/1998 | McKenzie et al. | 429/27 |
| 5,804,327 | A | * | 9/1998 | Oltman | 429/27 |
| 5,839,583 | A | * | 11/1998 | Pope et al. | 206/704 |

* cited by examiner

*Primary Examiner*—Kenneth W. Noland
(74) *Attorney, Agent, or Firm*—C. G. Mersereau; Nikolai & Mersereau, P.A.

(57) ABSTRACT

The present invention comprises a device for the convenient storage and controlled dispensing of objects, and includes at least the following components. A shell with a generally hollow interior cavity, an advancement slot, and at least one dispenser opening. A cartridge for location within the hollow interior cavity of the shell, such that the cartridge can be removed and contained within the shell. The cartridge optionally includes a cartridge bell disposed about the cartridge plate, wherein the cartridge belt is capable of receiving the objects for storage and dispensing. Captured within the advancement slot of the shell is an advancement arm comprising a first end for selective advancement of the objects and a second end to allow for control over the advancement arm in advancing the objects towards the dispensing opening of the shell, and for control of the advancement arm in retracting the advancement arm after dispensing.

36 Claims, 29 Drawing Sheets

STORAGE AND DISPENSING PACKAGE FOR BATTERIES AND OTHER OBJECTS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to devices capable of dispensing solid materials, specifically a device capable of enclosing one or more uniformly arrayed objects, temporarily adhered to or resting upon a cartridge belt, and subsequently separated from the cartridge belt, and presented through an exit opening, one measure or quantity of solid matter, at a time, through the use of a manual advancement arm.

2. Description of Prior An

Hardware manufacturers, battery manufacturers, confectioners, and pharmaceutical companies, and others, commonly package parts, batteries, confections, cord, tubing screws, wire, tablets or capsules, and other items. Various packages are designed to contain a continuous product or a number of identical items, and to ease the removal (or dispensing) of a single (or measured) quantity, at a time. Such packaging may also address issues of tamper-proofing, protecting and preserving or inactivating the contents.

Wire solder, for example, is commonly supplied, coiled on a spool or wound in a coil-shape. The user must pull and unroll a length of the solder for use. Frequent difficulties with the present art are having to constantly and awkwardly unroll more wire solder; as soldering continues, resulting in disruption of the soldering process Between the times of unrolling the wire solder, there is often either too much or too little wire solder available to the uses Support is lacking to hold the wire solder steady for the user.

Many other delicate or elastic continuous confections or materials require protection from distention or distortion. Therefore, the current art often distributes a product, affixed to a backing material. The art currently does not provide an adequate means for detaching and handling the often small and delicate products.

It is often difficult to open the packaging and remove or dispense a specific quantity of the objects, such as tablets and capsules, and many other uniformly-shaped objects. Vitamin tablets are often either packaged in a bubble-pack which requires peeling back or punching the tablet through a foil, paper, cardboard, or plastic membrane, in order to obtain the tablet. Alternatively, these tables may be distributed in jars, which require unscrewing a lid and shaking or pouring out the tablets, frequently dispensing more than the desired quantity. Both methods require several tasks which require two hands, may be difficult or cumbersome, and may be time-consuming. Both methods often result in tablets being dropped out of the user's hand, or other intended receptacle.

In the example of air-activated hearing-aid batteries, a particularly interesting, sophisticated, demanding, and challenging application, a number of methodologies have been applied to previous packaging efforts, in order to protect batteries from tampering and theft, prevent deterioration of the battery through premature energy loss, and allow the user to remove only one batter at a time, instead of having to handle or manage additional, unneeded batteries. Premature energy loss results when the inner cell is exposed to the atmosphere through built-in air holes in the flat bottom surface, prior to installation in the heating aid, when the air exchange is needed for optimal battery performance. Such loss is prevented by sealing the air-holes with pieces of specially-formulated, partially air-permeable sealant tape, called 'tabs'.

These batteries range in diameter from approximately 5 cm to 8 cm, or more, and in height from approximately 2 cm to 6 cm, or more. Handling of such batteries includes picking them up, pulling them loose from the sealant tabs or tape, viewing and orienting them, and positioning and placing them in or out of a batter holder. These processes are difficult for most humans, particularly for the (largely geriatric or handicapped) target population of hearing aid wearers.

Past approaches to packaging hearing aid batteries to transport, seal, and dispense such batteries, have included enclosing a row of three or four batteries, placed upon, and retained by, a strip of specially-formulated partially air-permeable sealant tape, permanently affixed to the inside base of a hinged plastic box.

This design suffered from the need for expensive fabrication processes, limited capacity (only three or four batteries fit within the case), lack of protection against tampering or fraudulent replacement of new batteries with spent batteries (through realignment of battery tabs to be used for batteries and placing these batteries in the case), and a lack of space for informational and advertising materials on the package. Most significantly, though, was the need for the user to use his or her fingers to pull out or pry out a battery, hold the small battery, and then place the battery properly oriented) into a hearing and battery door/battery holder, from either the side or the top, depending on the design of the battery door.

A subsequent offering retained the hinged box U.S. Pat. No. 4,209,091), but displaced the strip of sealant tape with batteries having individual sealant tabs on their flat surface. The batteries (tab side up) were retained by pliable plastic vertical walls (on two opposite sides of each batter), integral to the base of the plastic box. Gould Corporation one of the earliest manufacturers of such batters, employed this packaging with its ACTIVAIR and ACTIVAIR II lines of zinc-air batteries. This design suffered from the same difficulties in use of Gould's previous design, except that the user was now required to also pull off the 'tab' from the flat side of the battery, gripping the 'handle' of the tab, which extended barely 0.5 cm beyond the edge of the battery, on one side, and dispose of the tab, before proceeding with battery insertion.

Presumably, the earlier Gould design suffered from awkwardness in separating the battery from the strip, and possibly, from a failure of the adhesive strip (while it was mounted in the case) to allow the battery to properly exchange air. The newer, current adhesive tab material has been designed (and accepted industry-wide) to maintain the necessary air-permeability. In addition, the original strip adhesive was known to degenerate with time, becoming messy, sticking (in part) to the battery, and potentially subsequently interfering with proper battery performance and functioning within the hearing aid.

As the popularity of zinc-air batteries, increased, and additional manufacturers entered the market, most manufacturers standardized on the design of the tabs used to seal the batteries. The prevalent shape is now a refinement of the tabs, originally used in the later Gould offering.

Some battery vendors, such as Starkey Laboratories, offer packages of a single batter contained loosely within a round plastic 'bubble' (raised cylindrical area), attached to a piece of cardboard. These are most commonly provided, along with a hearing aid, when the aid is returned from being repaired or serviced. The customer removes the battery by prying open flaps (perforated strips cut into the cardboard back) and shaking out the battery. This packaging does provide a means of identifying and reducing tampering and fraud (by making it necessary for the user to open the cardboard backing, in order to access the battery), and does provide a surface (on the cardboard) for labeling and advertising—However, it does nothing to help a user handle, orient, or insert the battery into his or her aid.

A variation employed in later ACTIVAIR, ACTIVAIR 2, and ACTIVAIR II batteries (from Duracell), was to package three batteries, arranged in a triangle, on the cardboard backing, spaced 5 mm or more from each other, and covered by a single plastic bubble (comprised of three small battery-sized cylinders, retaining the three batteries) and contoured, reduced-area, plastic, connecting the three pod-like bubble regions.

Although this packaging addressed concerns of tampering and fraud, as in the single-battery bubble package, again it remained necessary for the user to tear open each of the three perforated flaps in the cardboard backing, in order to remove batteries. The user was still required to handle the battery, remove the sealant tab, and manually orient and insert the fresh battery into the hearing and battery door holder.

The next packaging style, the 'dial-pak', which has been adopted, with slight variations, by most current manufacturers of zinc-air hearing aids, including Duracell, Ray-O-Vac, Eveready, and others, was originally employed for mercury batteries. Mercury batteries predominated in the hearing aid battery market, prior to zinc-air batteries rise in acceptance and use, due to environment, efficiency, and performance factors. Mercury battery packages had evolved into a single unit, of overall cylindrical shape, containing a central hub. The small hub is attached through a hole in the cardboard backing of the packaging, allowing the plastic disk (the "dial"), having raised cylindrical bubbles over each of the batteries, to be rotated. A perforated cardboard flap is again employed on the back of the package, to allow the user access, from the rear, to the first battery. Access to subsequent batteries is obtained by rotating the plastic dial unit a battery is aligned with the cardboard flap on the backing, and then folding back the flap, so that the battery can be dropped out of the packaging.

A variation, using additional (and harder) plastic, has been used by Duracell. Here, the rotating bubble dial becomes a true cylinder, flat on its entire top face or surface, with internal curved plastic walls employed (cast or fabricated onto the flat face), to hold each battery in position within the cylinder. Operation, however, is identical, although batteries are packaged tab-side-up, as opposed to tab-side-down on the other dial-paks.

Union Carbide (U.S. Pat. No. 3,995,767) developed a different dial variation. In their design, the battery was removed through an exit hole in the outside of the cylinder (instead of through a hole or perforation in the cardboard back of the packaging), when one rotated the dial so that it was above one of the batteries. The battery was allowed to fall out through the outer shell, with the sealant tab still attached, as in previous dial designs.

Shelby Paper Box Company (U.S. Pat. No. 4,953,700) also developed a standard cylindrical dial package, with the sole additions of a battery tester integrated into the packaging and provisions for inserting test probes through holes provided in the packaging, top and bottom.

Eveready (U.S. Pat. No. 5,129,546) patterned alternative to the dial and bubble packaging, with a package having a straight or curved channel to hold batteries (with tabs attached), containing both entrance and exit holes, having one-direction barriers. Thus, the user would insert a spent battery in the entrance hole and simultaneously push out a fresh battery from the exit hole. The unit was proposed to handle a relatively small number of batteries (6) and was designed to be placed in an accompanying, custom shell or case, to seal and protect it and the batteries. This design suffered from the additional requirement of the user having a spent battery, to insert into the one opening, in order to obtain a fresh one.

Another manufacturer, Varta (U.S. Pat. No. 5,203,455), patented a variant of the older bubble packaging, by placing all of the batteries on a single, centrally-anchored piece of sealant film or tab. As a user pushed the battery through perforations in the cardboard backing, the user would also peel the battery loose from the tabbing material. Therefore, tab removal would presumably be easier than with the standard battery tabs, and the tab material would not require separate disposal.

In spite of these minor changes, the central problems of handling (tab removal, dropping, fumbling with, losing, and struggling to pick up) the tiny hearing aid batteries remain. In addition, all previously described designs require the user to properly orient the battery, while keeping the hearing aid battery door open, and then insert the battery from the side or top into the battery door holder on the battery door.

One battery manufacturer, Renata (U.S. Pat. No. 5,033,616), has produced alternative packaging, consisting of a bubble-pack, containing a number of batteries (typically four, six and eight), fastened to a cardboard backing. The required sealant tab(s) are affixed to the cardboard backing. With this packaging, the user peels down a perforated cardboard flap, under the appropriate battery, and then pulls off the battery from the tab. The batteries are arranged in a row, above corresponding flaps under plastic bubble packaging.

This design does provide some protection against tampering and theft, and does allow the user to perform the operation of separating the battery from the sealant tab, at the same time as removing the battery from the packaging. Unfortunately, separating the battery from the sealant tab on the cardboard is still a difficult task for many users. The disadvantages persist of requiring the user to handle the battery, and orient and insert the battery properly into the battery door.

Beltone (U.S. Pat. No. 4,860,890) patented a somewhat similar packaging idea, resembling a matchbook. Opening the cover, revealed a row of separate cardboard strips, with batteries affixed to tabs, which were secured to the strips. The user would tear off one of the strips, at a perforation, and use the cardboard to hold the battery, instead of holding the battery by the tab. One would still have to remove the tab, either before or after placing the battery into a battery door. Protection of the packaging and its contents was limited, and of course, the user had more than simply a tab to dispose of, following insertion, as the tab also had the piece of cardboard attached.

A recent Duracell patent (U.S. Pat. No. 5,839,583) proposes a return to the sort of hinged case with batteries retained in a base, that Gould originally offered. Duracell, however, attempts to address the problem of battery tabs, by putting a single tab over all of the batteries in the case, anchoring the tab material to the center of the base, and requiring the user to remove a batter by lifting on the edge of the tab material (thereby also lifting a battery up and out of its pocket in the base) and then to peel the battery loose from the tab. Duracell also noted a potential advantage of this design, by allowing machine-automated placement of batteries into the pockets in the base, instead of a traditional, labor-intensive manual process of packaging batteries. Again, although this does reduce the nuisance of disposing of tabs, it does nothing to aid in the actual removal of tabs, nor the handling of the battery by the user.

Another pair of patents assigned to Bausch and Lomb (U.S. Pat. Nos. 5,117,977, and 5,199,565) are related to each other and describe specialized devices, having enclosed chambers containing fresh batteries, into which the opened battery doors of hearing aids are inserted. These devices attempt to reduce the requirement of a user to handle hearing aid batteries and properly oriented them for insertion into the battery door holder of a hearing aid. A separate chamber is required for each and every new battery, and must be additionally fabricated to work for either a left-ear hearing aid or a right-ear hearing aid. The user must present the hearing aid, with spent battery in the door holder, to a specialized corresponding (left- or right-ear) removal chamber, and then either twist the aid or push a plunger mechanism, in order to expel a used battery into a chamber, contained, within the dispenser.

Then, the user removes the aid and moves it to a separate specialized (left- or right-ear specific) dispensing chamber (or reveals a separate dispensing chamber), that has a fresh battery in it. Another operation is required to place a fresh battery into the door holder, after which the user removes the aid, without letting the new battery fall out of the door, and closes the battery door on the aid. For air-activated batteries, these designs propose to use a piece of plastic to completely seal the bottom of the battery, as it is held in one of the chambers, awaiting dispensing, or to completely seal fresh battery chambers or reservoirs with a plastic seal. Once a dispenser has had all of the batteries removed, the user is expected to return the entire unit to the manufacturer for servicing or refurbishing, which would include removal of the spent batteries from a chamber, possibly replacing or repairing parts and the tape sealant plastic, and installing new batteries into each of the dispensing chambers of the unit. While awaiting servicing and return of a dispenser, the user would need to purchase one (or two, if they were made left- and right-ear specific, instead of in a combination) additional dispenser. Also, the user might need to have two units, anyway, if the user has consumed the batteries in the chambers for one aid more rapidly than for the other.

These designs are complex, relatively bulky, cumbersome, and expensive to fabricate, assemble, and manufacture. In addition, they require the user to complete many steps, in proper sequence. They presume sales of left-, or right-ear-only packaging or combined-ear packaging, which would assume consumption of batteries at a comparable rate for both aids. They assume that consumers and manufacturers (and distributors, who currently often play an important role in battery sales and installation) would find it worthwhile to reuse and recycle the dispensers. They assume that zinc-air batteries would maintain their shelf or storage life, while secured by a plastic flap, instead of the industry's common practice of using tabs. And they assume that hearing aid manufacturing would agree on some common styles and dimensions for hearing aid battery doors, such that aids from most manufacturers would work properly with these devices, is without confusion or possible jamming, or damaging the device or the user's hearing aid.

Finally, prior art includes battery insertion tools, which have sometimes been supplied with hearing aids by various hearing aid manufacturers. These tools have consisted of a straight plastic staff or rod, containing an inserted or embedded cylindrical magnet on one end, and/or an integral brush (with which to dust and clean the hearing aid). Once the user has removed a battery and removed the sealant tab, these devices, while not addressing any packaging issues, are helpful for handling the battery (picking up loose batteries, and extracting some batteries from battery doors). However, batteries tend to freely shift, spin, or rotate on the magnet tip, adding to user difficulties in insetting batteries.

Although several divergent approaches, as presented above, have been taken to overcome the problems inherent in the storage, packaging, and dispensing of small objects such as zinc-air batteries, they all suffer from one or more of the following disadvantages:

a) They require the user to perform numerous sequential steps, in order to place the object in the target device or intended location.

b) They require the user to visually identify and select an available battery for use.

c) They require the user to flip over the dispenser, losing assistance of visual contact, necessary for accurate control of the object.

d) They require the user to pry open an often degradable cardboard flap to release a battery.

e) They require the user to either catch or pick up from a flat surface the battery from the package of dispenser.

f) They require the user to remove the tiny battery sealant tab from the battery (in the case of zinc-air batteries), requiring use of two thumbs and two fingers, or pliers, tweezers, etc.

g) They require the user to dispose of the tiny battery sealant tab from the battery (in the case of zinc-air batteries).

h) They require the user to properly orient the often tiny batteries, while their own fingers obscure their vision.

i) They require the user to place the tiny batteries within the target device without being able to see the battery well, because of their fingers.

j) They do not facilitate one-handed, ergonomic operation, from all azimuths. (), k) They are not conveniently dimensioned for carrying in a slacks or shirt pocket.

l) They use expensive fabrication processes (especially the designs like Bausch and Lomb's complicated removal and insertion machines).

m) They require size-specific packaging components for each size battery or object.

n) They make it difficult for the manufacturing to scale the packaging to accommodate larger quantities, without drastically revising the packaging and components.

o) They limit retail display options to hanging the dispensers by the attached cardboard backing.

p) They use expensive manual processes for some steps of the packaging affixing tabs or inserting batteries into the packaging).

q) They offer the manufacturer or distributor little or no protection against accidental or fraudulent user reinsertion of used or spent batteries into the packaging (causing false complaints or product failure).

r) They make no affordable or plausible provision for reusing or reloading the dispensing package and thereby fail to offer a non-disposable (refillable) option to the manufacturer and consumer.

s) They require the user to separate, pull, unroll, or manually peel away backing material, in order to dispense many products (as in wire solder, confections, screws, and antacids).

t) They make no provision for uniform and measured amounts of product to be easily dispensed by the user (as in wire solder, confections, and shrink-tubing).

u) They make no provision to quickly and easily dispense a controlled quantity of objects (as in tablets and capsules).

SUMMARY OF THE INVENTION

An object of the present invention is to provide a simple-to-use dispenser for users, including handicapped and geriatric populations, which dispenses one item (or predetermined quantity), with a single, one-handed motion, retaining control and visibility of the object, aiding in the movement of the object to the target device, receptacle, or location, and which is able to be inexpensively manufactured as either a reusable or disposable product, capable of handling different quantities and sizes of product through installation of alternative strips or cartridges.

These and other objects of the present invention will become apparent to those skilled in the art upon reference to the following specification, drawings, and claims.

The present invention intends to overcome the difficulties encountered heretofore. To that end, the present invention comprises a device for the convenient storage and controlled dispensing of objects, and includes at least the following components. A shell with a generally hollow interior cavity, an advancement slot, and at least one dispenser opening. A cartridge for location within the hollow interior cavity of the shell, such that the cartridge can be removed and contained within the shell. The cartridge may additionally include a cartridge belt disposed about the cartridge, wherein the cartridge belt is capable of receiving the objects for storage and dispensing. Captured within the advancement slot of the shell is an advancement arm comprising a first end for selective advancement of the objects and a second end to allow for control over the advancement arm in advancing the objects toward the dispensing opening of the shell, and for control of the advancement arm in retracting the advancement arm after dispensing.

BRIEF DESCRIPTION OF THE DRAWINGS

FIG. 12b is an elevational view of the perch depicted in 12a.

FIG. 12c is a side view of the perch depicted in FIG. 12a.

DETAILED DESCRIPTION OF THE INVENTION

Figure 1:
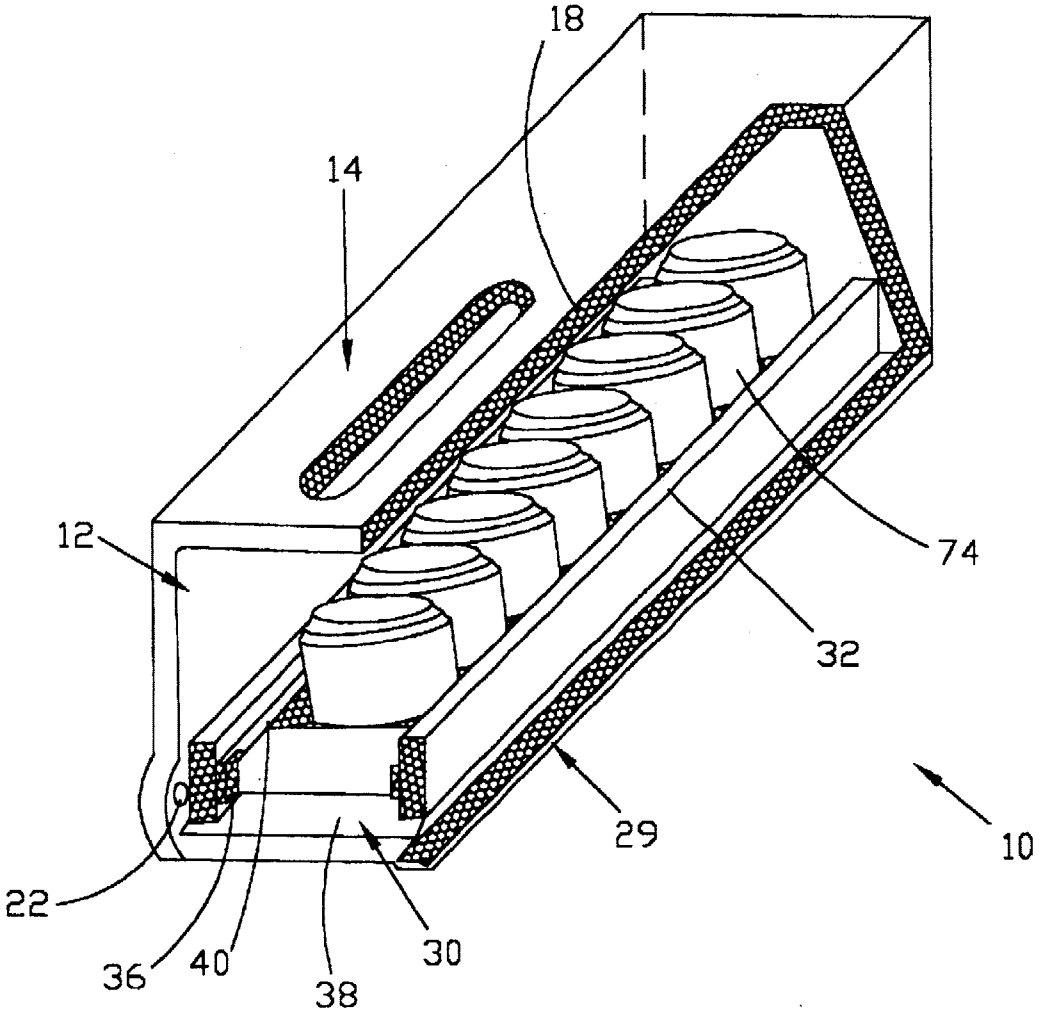
FIG. 1 is the perspective view of a device without an advancement arm and a perch for dispensing objects.
Figure 2:
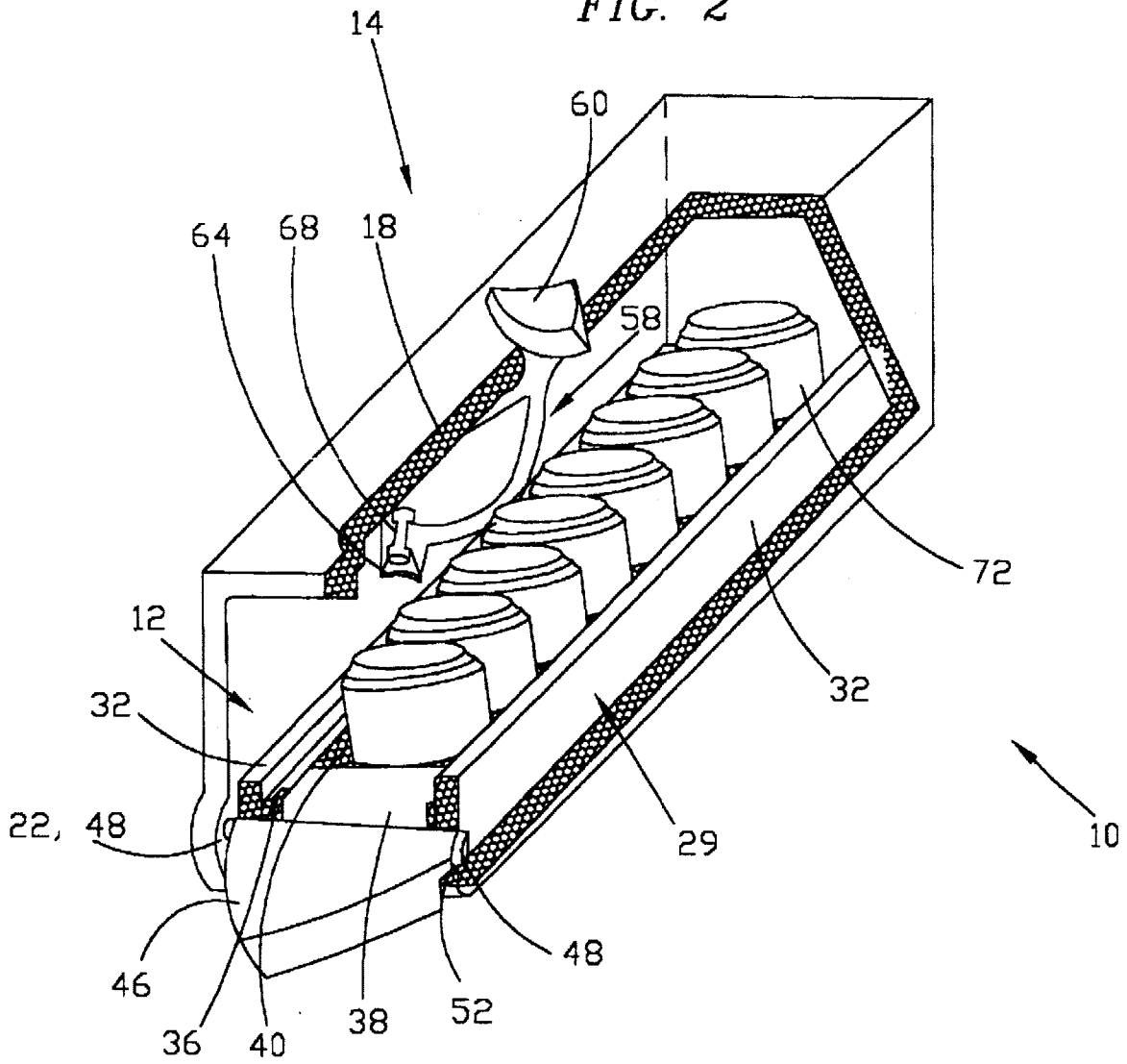
FIG. 2 is a perspective view of the device of FIG. 1 including an advancement arm and perch.
Figure 3:
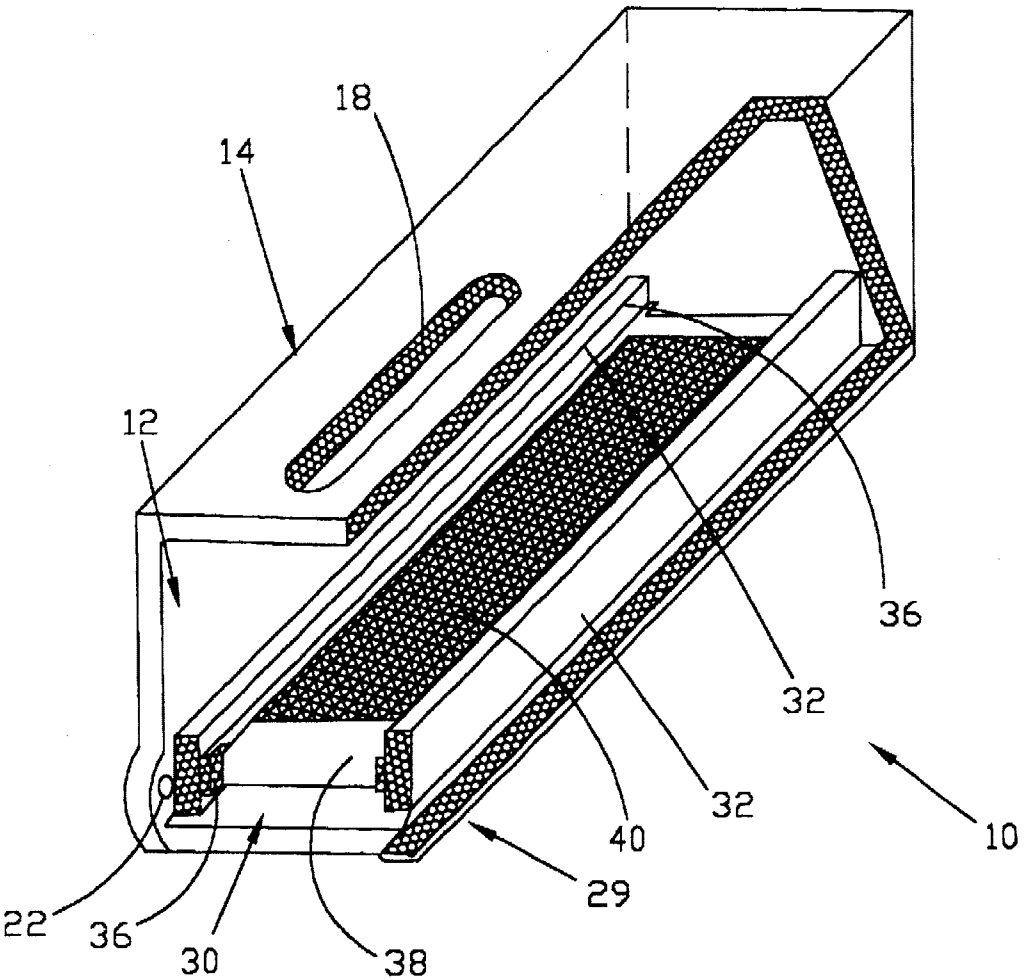
FIG. 3 is a perspective view of the shell and cartridge of the device of FIG. 1.

In the Figures, FIG. 2 shows a device 10 for the convenient storage and controlled dispensing of objects 72

Figure 4:
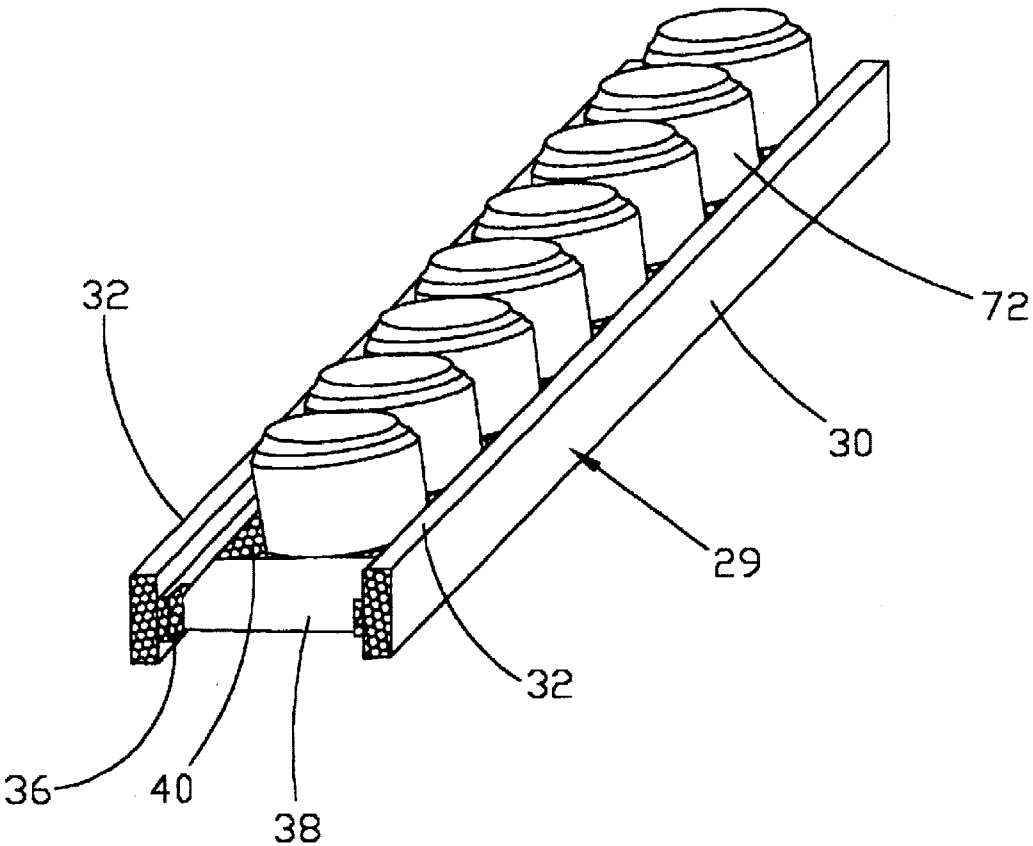
FIG. 4 is a perspective view of the cartridge and objects depicted in FIG. 1.
Figure 5:
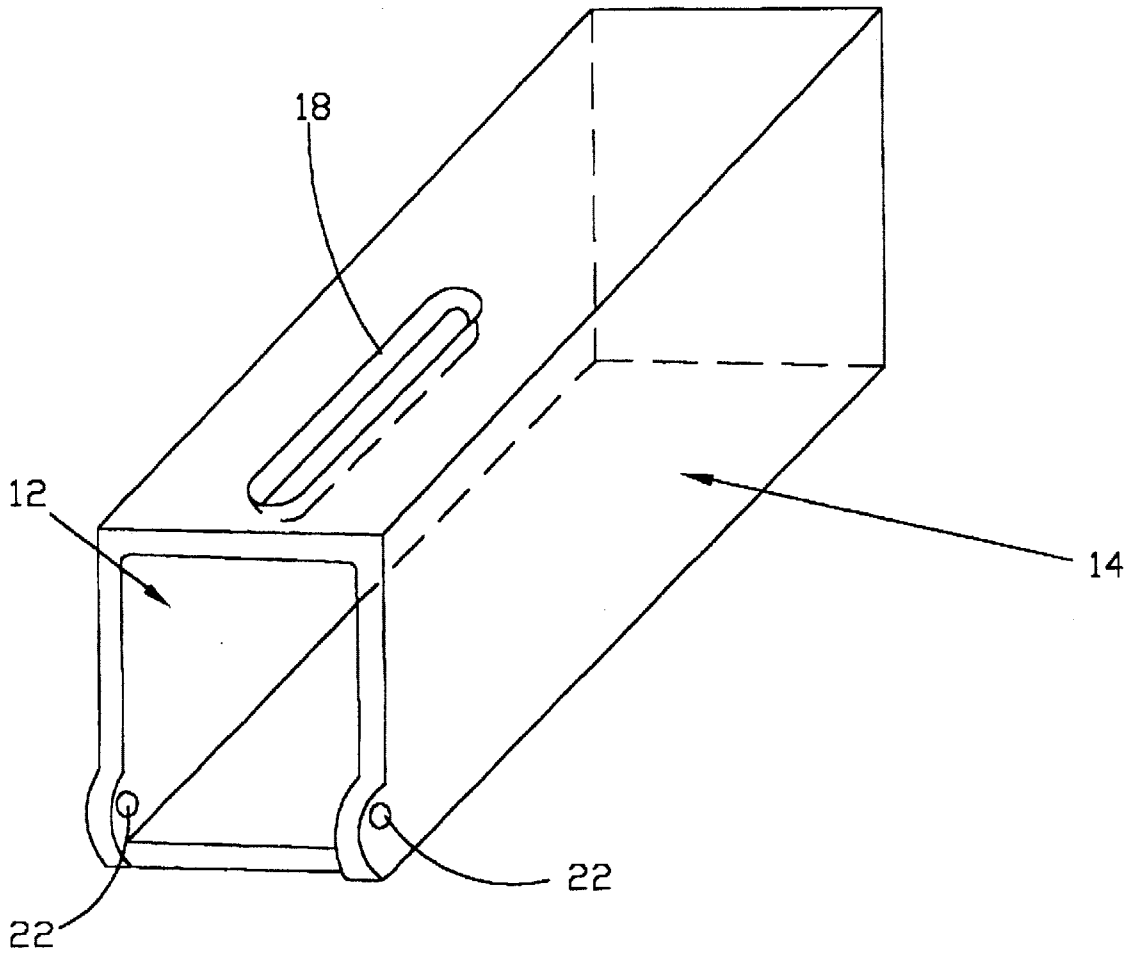
FIG. 5 is a perspective view of the shell of the device of FIG. 1.
Figure 6:
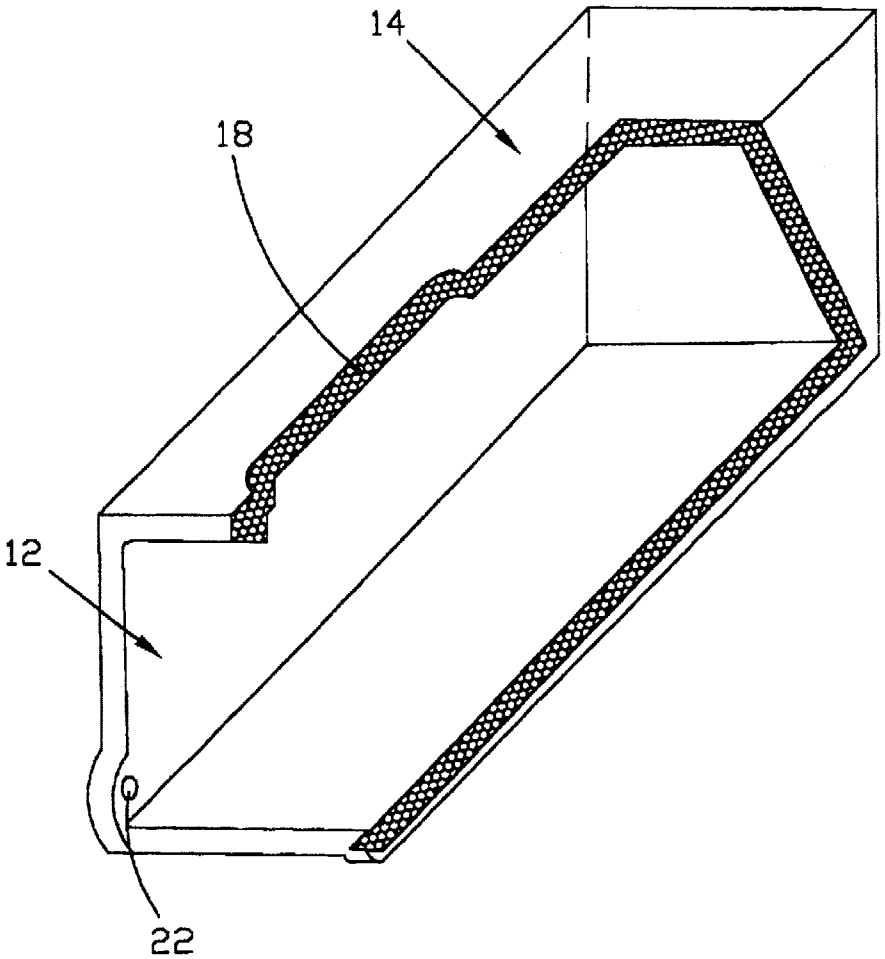
FIG. 6 is a perspective view of the shell of FIG. 5.
Figure 8:
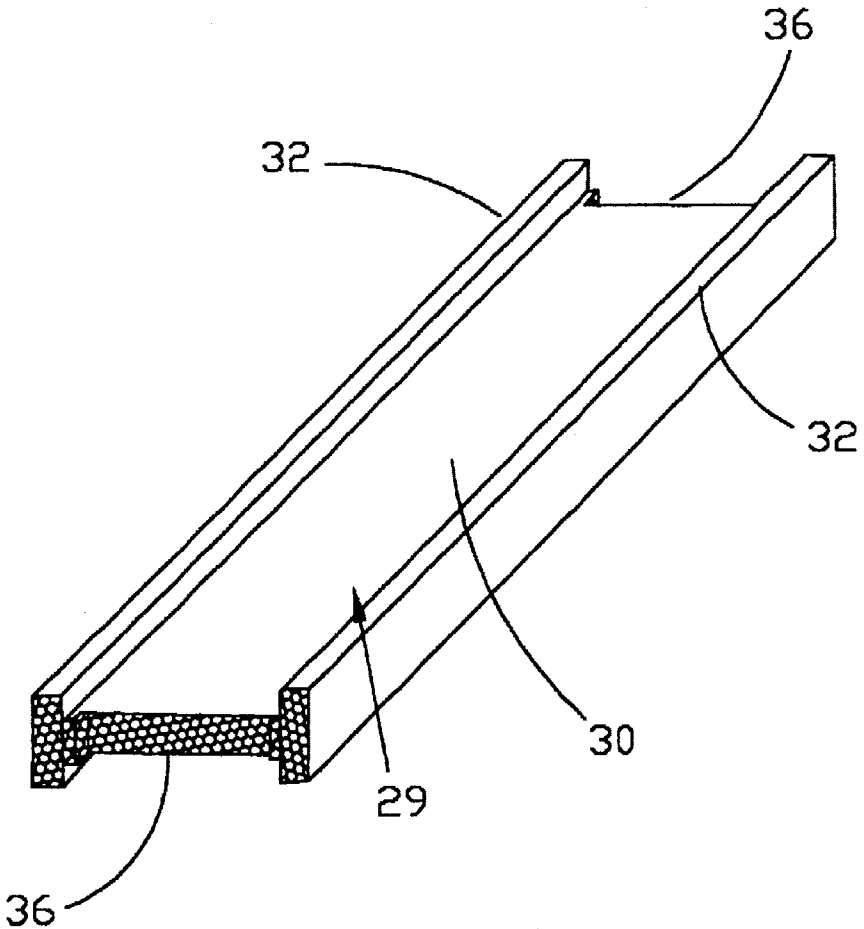
FIG. 8 is a perspective view of the cartridge plate of the device depicted in FIG. 1.
Figure 9:
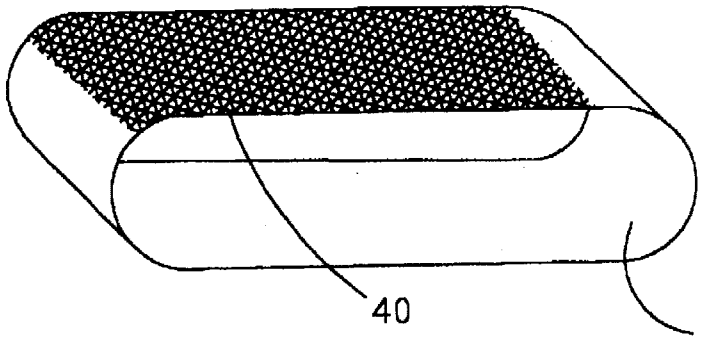
FIG. 9 is a perspective view of the cartridge belt of the device depicted in FIG. 1.
Figure 10:
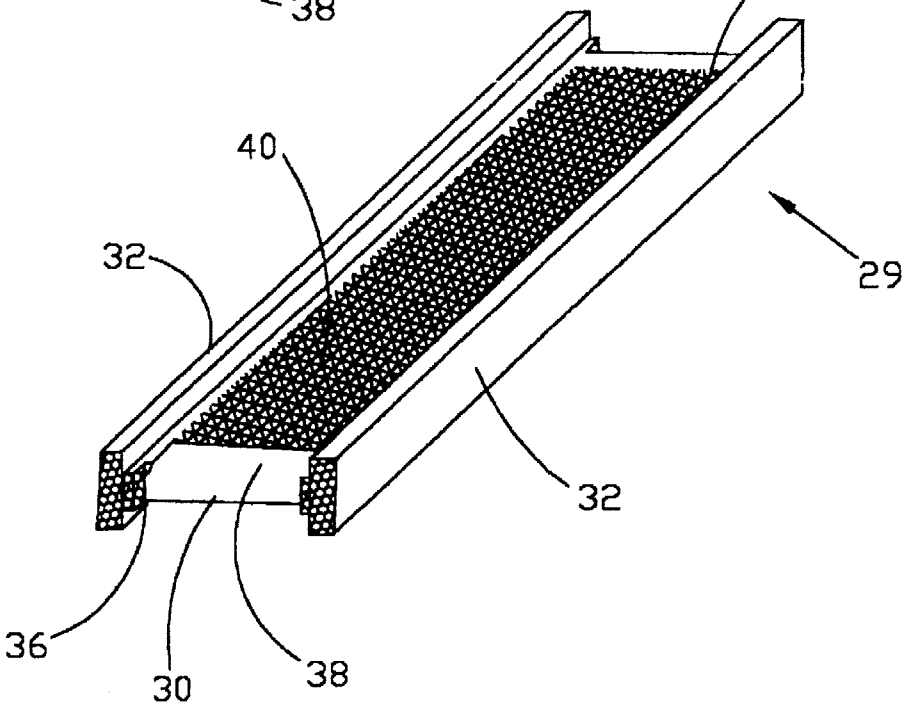
FIG. 10 is a further perspective view of the cartridge of the device depicted in FIG. 1.

(preferably button-top zinc air batteries). The device 10 includes a shell 14 shown in partial cutaway view. The shell 14 further comprises an advancement slot 18 and a dispenser opening 12. The shell 14 is comprised of material of the nature of LUCITE. In general, the interior of the shell 14 consists of a hollow interior cavity, with a cartridge 29 locatable within the generally hollow interior cavity of the shell 14. The hollow interior cavity of the shell 14 thereby removably contains the cartridge 29. The cartridge 29 can be comprised of material similar to that of the shell 14, or a more flexible material like that common to TUPPERWARE products. For example, the flexibility will ease the ability to install cartridge belt 38 and to remove and insert the cartridge 29, and retains a memory for its original shape. The embodiment shown in FIG. 2, includes a cartridge belt 38 disposable about the cartridge 29 and capable of receiving for semi-permanent storage and dispensing objects 72. Preferably, the cartridge belt 38 comprises a continuous loop disposed around a cartridge plate 30 (see FIG. 10), wherein the cartridge plate 30 of the cartridge 29 lies between a pair of siderails 32. The siderails 32 of the cartridge 29 provide for removable securement of the cartridge 29 within the hollow interior of the shell 14, this prevents the cartridge 29, and the objects 72 contained thereon, from moving in a direction transverse to the direction of advancement. In other words, the cartridge 29 captured in this manner preferably allows for cartridge belt 38 movement only in the direction towards the dispenser opening 12 of the shell 14. See also, FIG. 4 and FIG. 8 which show in greater detail the constituent components of the cartridge 29 in relationship to the objects 72 (in the case of FIG. 4). The cartridge 29 also includes a recess notch 36, whereby the cartridge belt is recessed away from the siderails 32. This allows for separation of the cartridge belt 40 from both the perch 46 and the rear of the shell 14.

Figure 7:
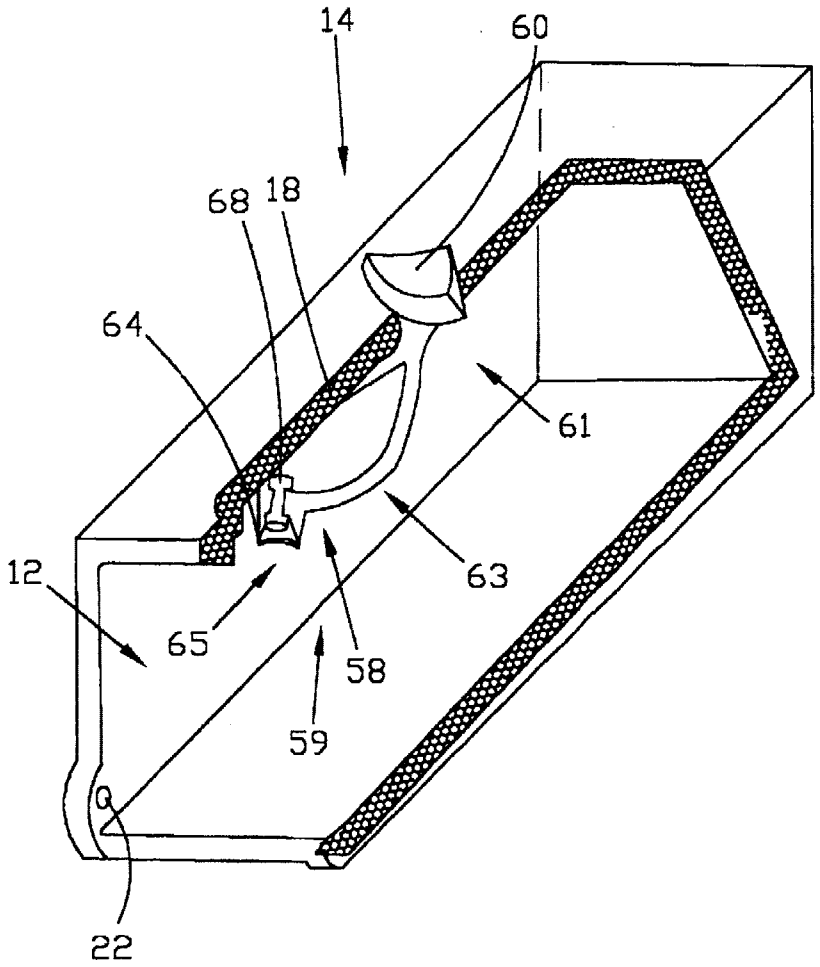
FIG. 7 is a perspective view of the shell of FIG. 6 including the advancement arm.

The shell 14 of the device 10 also includes an advancement slot 18 for capture of an advancement arm 58. FIG. 2 and FIG. 7 show best the operational communication between the shell 14 and the advancement arm 58 of the device 10. FIGS. 12d–g show the advancement arm 58 individually from various perspectives. The advancement arm 58 includes a first end 59 for the selective advancement of the objects, and a second end 61 which allows for control of the advancement arms 58 in advancing the objects toward the dispenser opening 12 of the shell 14 during the operation of the device 10. Additionally, the second end 61 of the advancement arm 58 also allows for control in retracting the advancement arm 58 after dispensing. The first end 59 of the advancement arm 58 further comprises a base 65 which includes a magnetic insert 68 and an object support 64. In this embodiment, the first end 59 of the advancement arm 58 can directly engage and advance the objects 72 through contact with the base 65. In the case of, for example, zinc air batteries, the object support 64 can physically engage the object 72 while the magnetic insert 68 can magnetically engage the object 72 for advancement. The advancement arm 58 also includes a yoke 63. In the embodiment shown in FIGS. 12d–g the yoke 63 comprises a split yoke lying between the base 65 and the second end 61 of the advancement arm 58. The yoke 63 splits in two halves providing an opening there between of sufficient separation to straddle the objects 72 during engagement. Further, the second end 61 of the advancement arm 58 also includes a thumb rest 60 shaped and positioned for convenient operation of the advancement arm 58 in advancing and retracting by the thumb of a user. FIG. 12e shows that the position of the thumb 60 and the lock support 62 provides a notch to allow the thumb 60 to releasably engage with the advancement slot 18. In this manner, the thumb 60 of the advancement arm 58 locks against the advancement slot 18 by capturing the rearward end of the advancement slot 18 between the thumb 60 and the lock support 62. Of course, the advancement arm 58 unlocks merely by forward movement of the advancement arm 58 away from the rearward section of the advancement slot 18. In other words, the advancement arm 58 slides within the advancement slot 18 of the shell 14 to accomplish the advancing, retracting, and locking of the advancement arm 58 within the advancement slot 18.

Figure 12A:
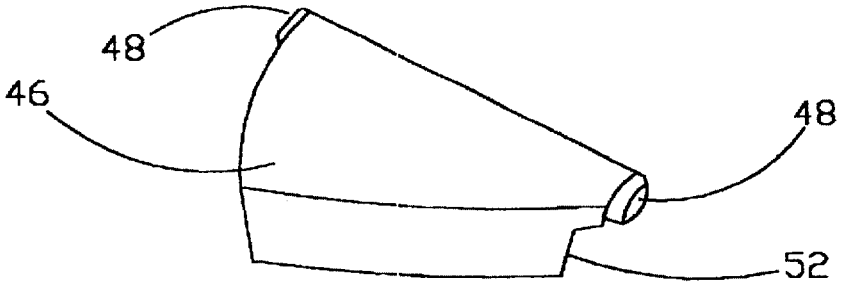
FIG. 12a is a perspective view of the perch of the device depicted in FIG. 1.
Figure 12B:
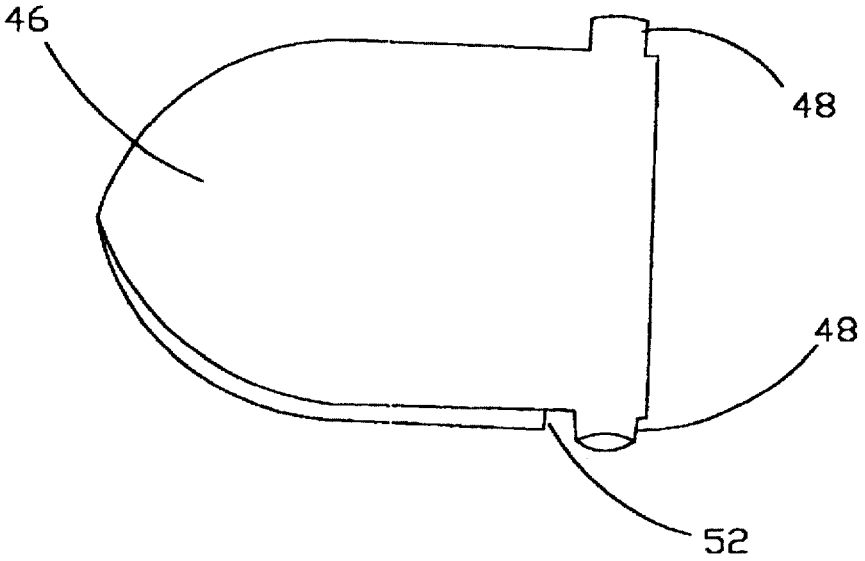
Figure 12C:
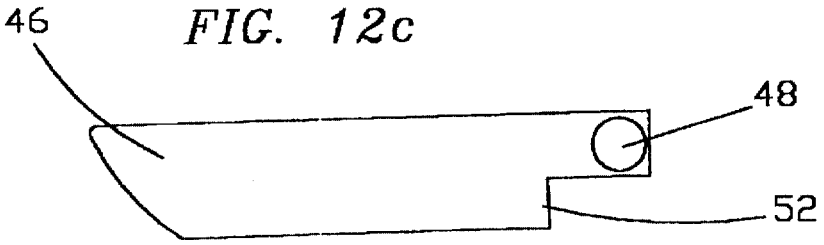
Figure 12D:
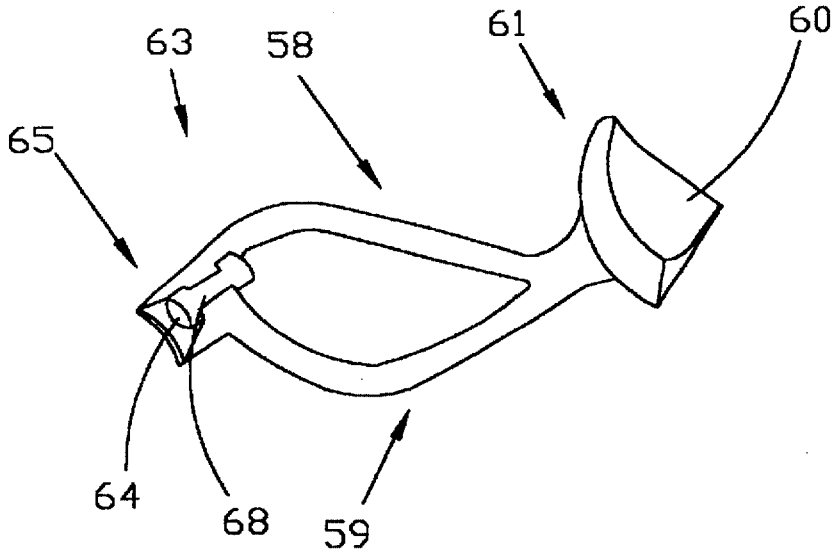
FIG. 12d is a perspective view of the advancement arm of the device depicted in FIG. 2.
Figure 12E:
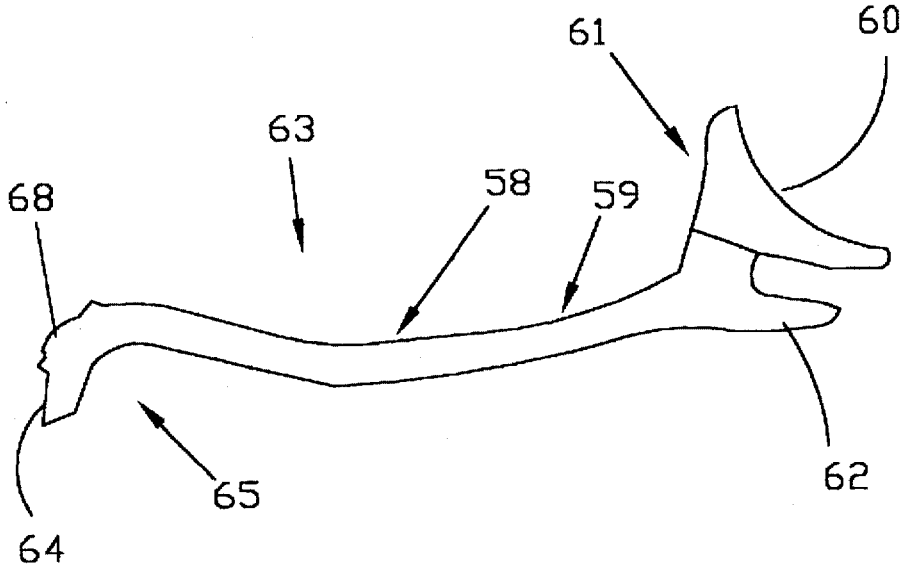
FIG. 12e is a side view of the advancement arm depicted in FIG. 12d.
Figure 12G:
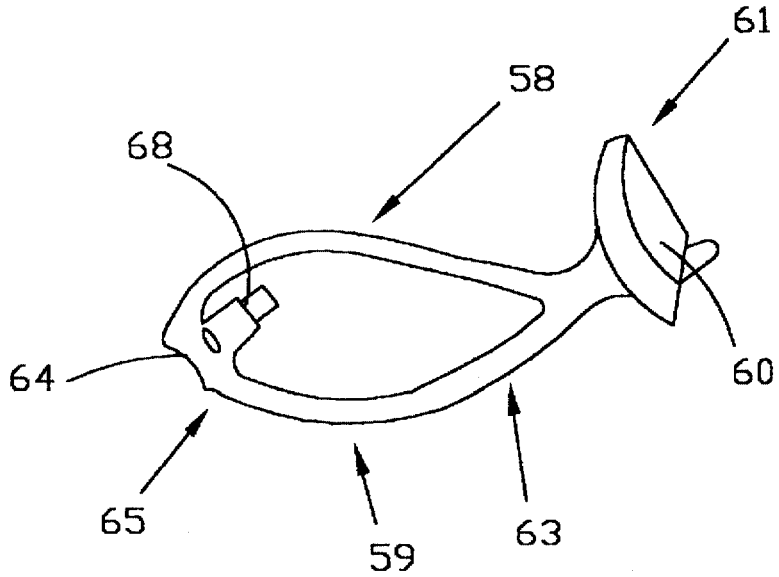
FIG. 12g is a perspective view of an advancement arm with an alternative yoke and base orientation.
Figure 12F:
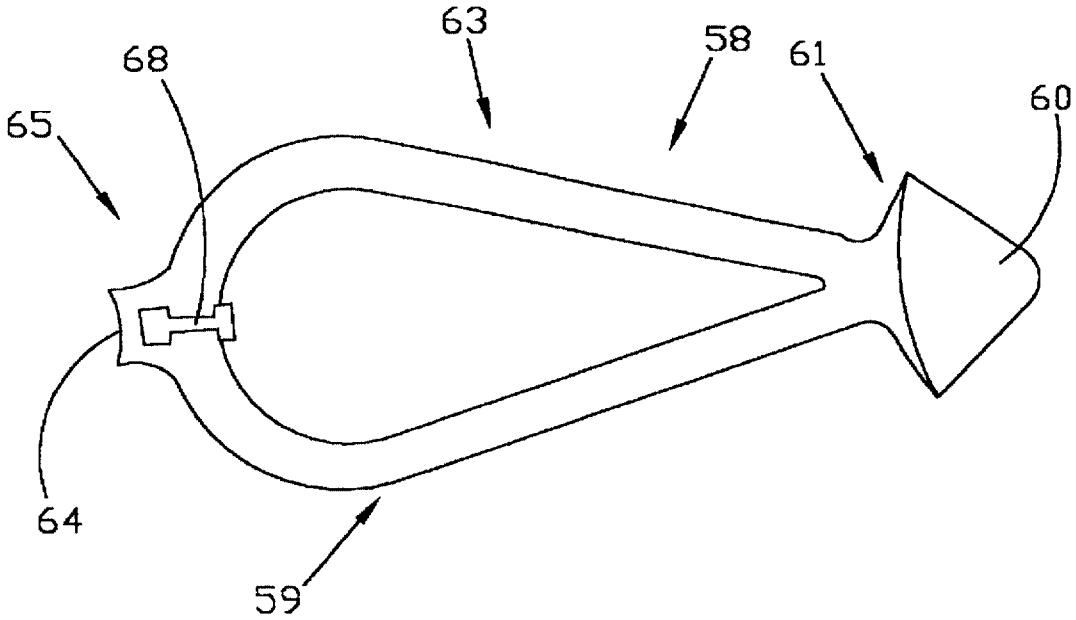
FIG. 12f is a top plan view of the advancement arm depicted in FIG. 12d.

FIG. 12g shows a variation in the advancement arm 58. In contrast to the advancement arm 58 shown in FIGS. 12d–f, the yoke 63 of the advancement arm 58 shown in FIG. 12g orients in a different manner with the base 65. The two split prongs of the yoke 63 show in FIG. 12g, combine with the base 65 at a position closest to the object support 64. By contrast, the prongs of the yoke 63 shown in FIGS. 12d–f combine with the upper portion of the base 65. The advantage of the advancement arm 58 shown in FIG. 12g comprises creating a more planer bottom profile for the advancement arm 58 and protrusion of the rod magnet 68 through the thumb advance slot 18 of the shell 14. Shown best by comparing FIG. 12e with FIG. 12g, the advancement arm 63 of FIG. 12g presents a more planer relationship between the yoke 63 and the base 65. This allows for more clearance over the objects 72 when retracting the advancement arm 58.

The device 10 also includes a perch 46, shown individually in FIGS. 12a–c. The perch 46, generally triangular in shape, preferably hingeably attaches to the lower portion of the advancement opening 26 of the shell 14. For example, FIG. 2, and FIGS. 13–17 show the perch 46 attached to the shell 14 through hinge protrusion 48 which extend from the perch 46 into hinge holes 22 located in the shell 14. The perch 46 also includes a support shoulder 52 located adjacent to the hinge protrusions 48 to stabilize the perch 46 when in the dispensing position (see FIG. 2). Configured in this manner, the perch 46 not only provides for removable containment of the cartridge 29 but also provides a smooth transition for receipt of the object 72 upon advancement prior to dispensing.

In order to facilitate functional operation of the device 10 with zinc air batteries designed for use with hearing aids, the cartridge belt 38 includes an adhesive surface 40. The adhesive comprises a material of the nature of battery sealant tabs, or the like. Again, the zinc air batteries activate upon exposure of holes in the bottom side of the batteries to air. Thus, to avoid unnecessary power loss during storage requires covering the perforations until a time just prior to installation. The adhesive surface 40 of the cartridge belt 38 preserves an appropriate seal between the cartridge belt 38 and the zinc air batteries. The adhesive surface 40 also eliminates the need for individual tabs used by prior devices. The tabs prove difficult to remove and to install during manufacturing.

Figure 13:
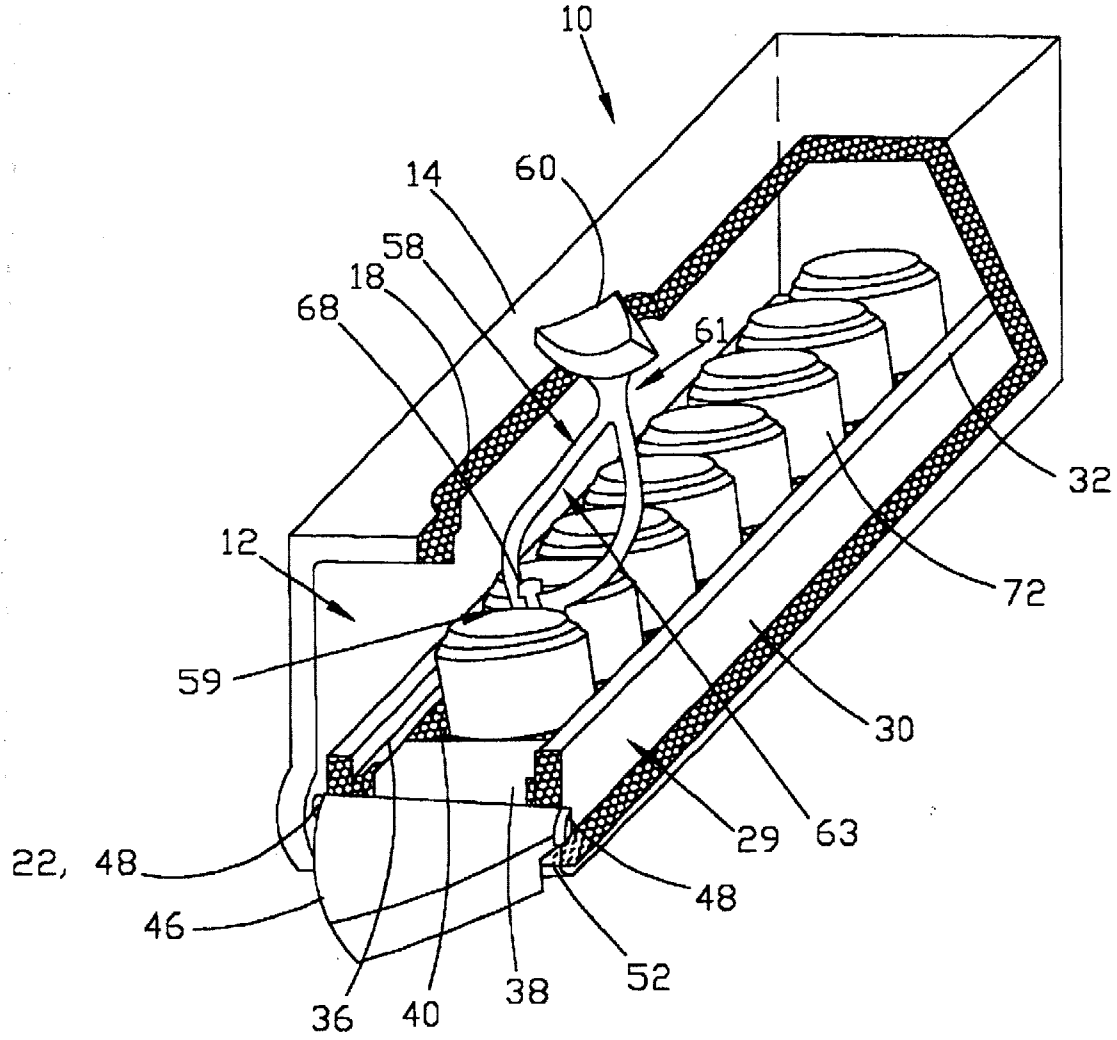
FIG. 13 is a perspective view of the device depicted in FIG. 2 in a first stage of operation, shown in partial cutaway.
Figure 14:
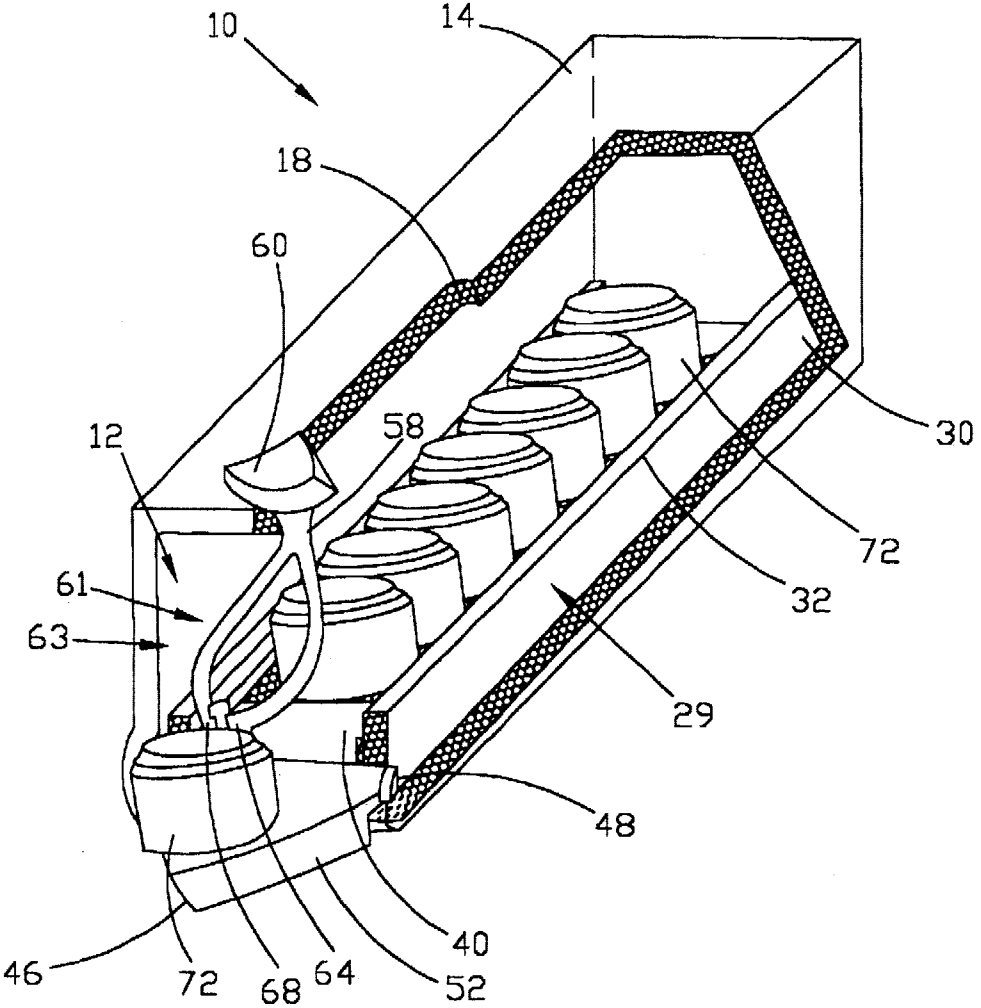
FIG. 14 is a perspective view of the device depicted in FIG. 2 in a second stage of operation, shown in partial cutaway.

The following, according to FIG. 12 and FIG. 13, describes the operation of the embodiment of the device 10 just described. FIG. 13 shows the advancement arm 58 engaged with an object 72. The advancement arm 58 located rearward in the advancement slot 18 allows for forward movement. Forward movement of the advancement arm 58 by extending a forward force on the thumb rest 60 advances the object 72 and thereby the cartridge belt 38, by virtue of the adhesive engagement between the object 72 and the adhesive surface 40 of the cartridge belt 38. Advancing the advancement arm 58 in the advancement slot 18 towards the dispenser opening 12 brings the object 72 toward, and eventually in contact with, the perch 46. At this point, the adhesive surface 40 moves downward and away from the bottom of the object 72, thereby separating the object 72 from the adhesive surface 40 of the cartridge belt 38 and fully onto the perch 46 in the manner depicted in FIG. 144. In this position, the base 65 of the advancement arm 58 engages the object 72 both physically with the object support 64 and magnetically with the magnetic insert 68. At this point, continued pressure on the thumb rest 60 of the advancement arm 58 maintains the object 72 on the perch 46. In the case of; zinc air hearing aid batteries this position allows for easily loading the object 72 into the battery compartment of a hearing aid. Since the base 65 of the advancement arm 58 maintains magnetic and physical contact with the object 72 the device 10 can be rotated into any position while still maintaining the orientation of the object 72 on the perch 46. The triangular shape of the perch 46, and the object 72 positioned on the tapered end of the perch 46 along with the narrow shape of the first end 59 of the advancement arm 58 allows for sufficient room to maneuver the object into the desired position or location. This provides stability for very small objects like zinc air hearing aid batteries which are particularly difficult to handle, especially for elderly or infirmed individuals who in many cases comprise the primary uses of such items.

After placing the object 72 in its desired location, pressing down and back on the thumb 60 of the advancement arm 58 raises the advancement arm 58 for retraction within the advancement slot 18 of the shell 14. In this position, the yoke 63 and the base 65 of the advancement arm 58 lie above the remaining objects 72, and sliding the thumb rest 60 of the advancement arm 58 rearward in the advancement slot 18 places the advancement arm in a position to either advance the next object 72, or lock the retraction lock support 62 in place within the advancement slot 18 for storage.

Figure 15:
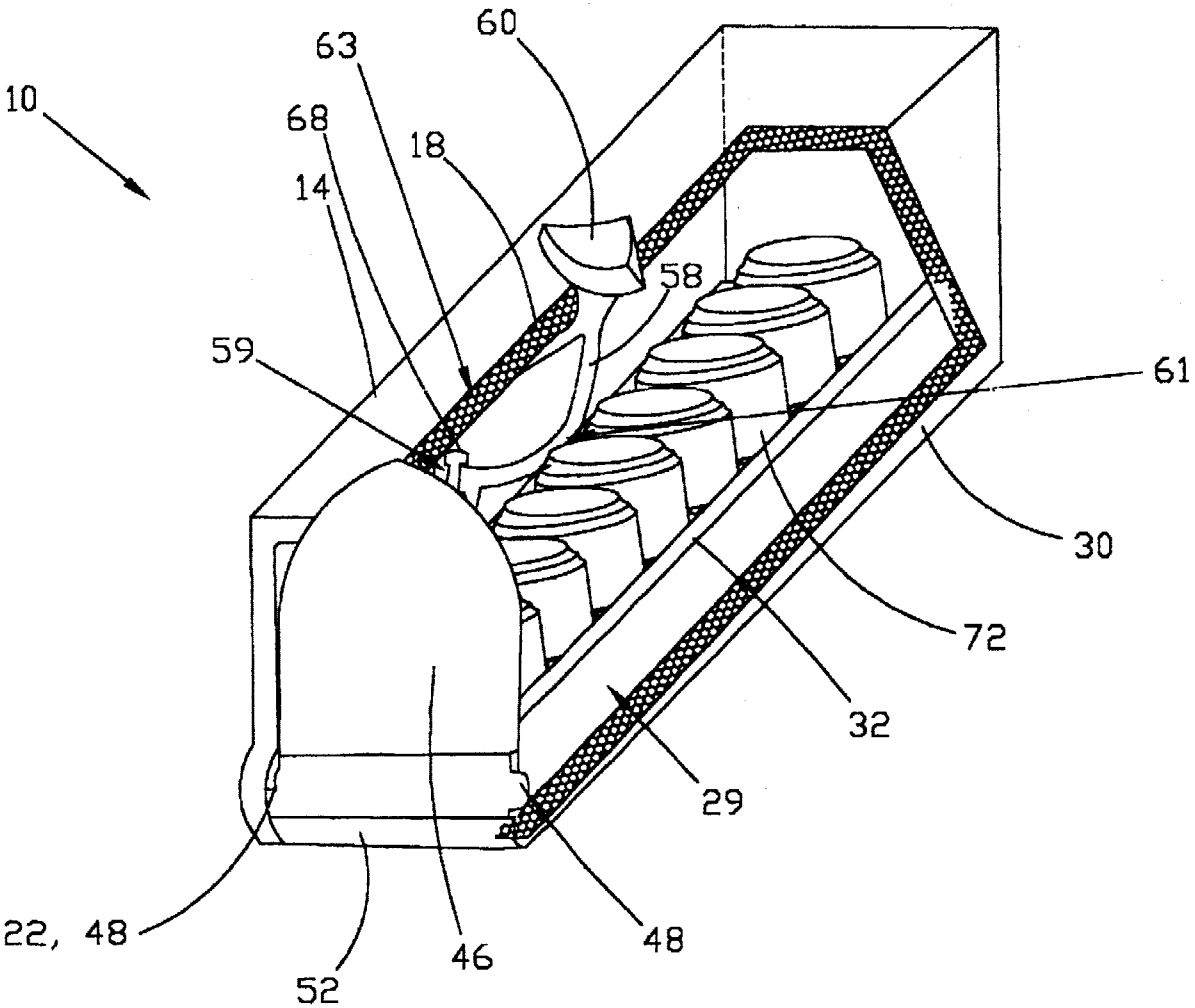
FIG. 15 is a perspective view of the device depicted in FIG. 2 with a perch in a closed position, shown in partial cutaway.
Figure 16:
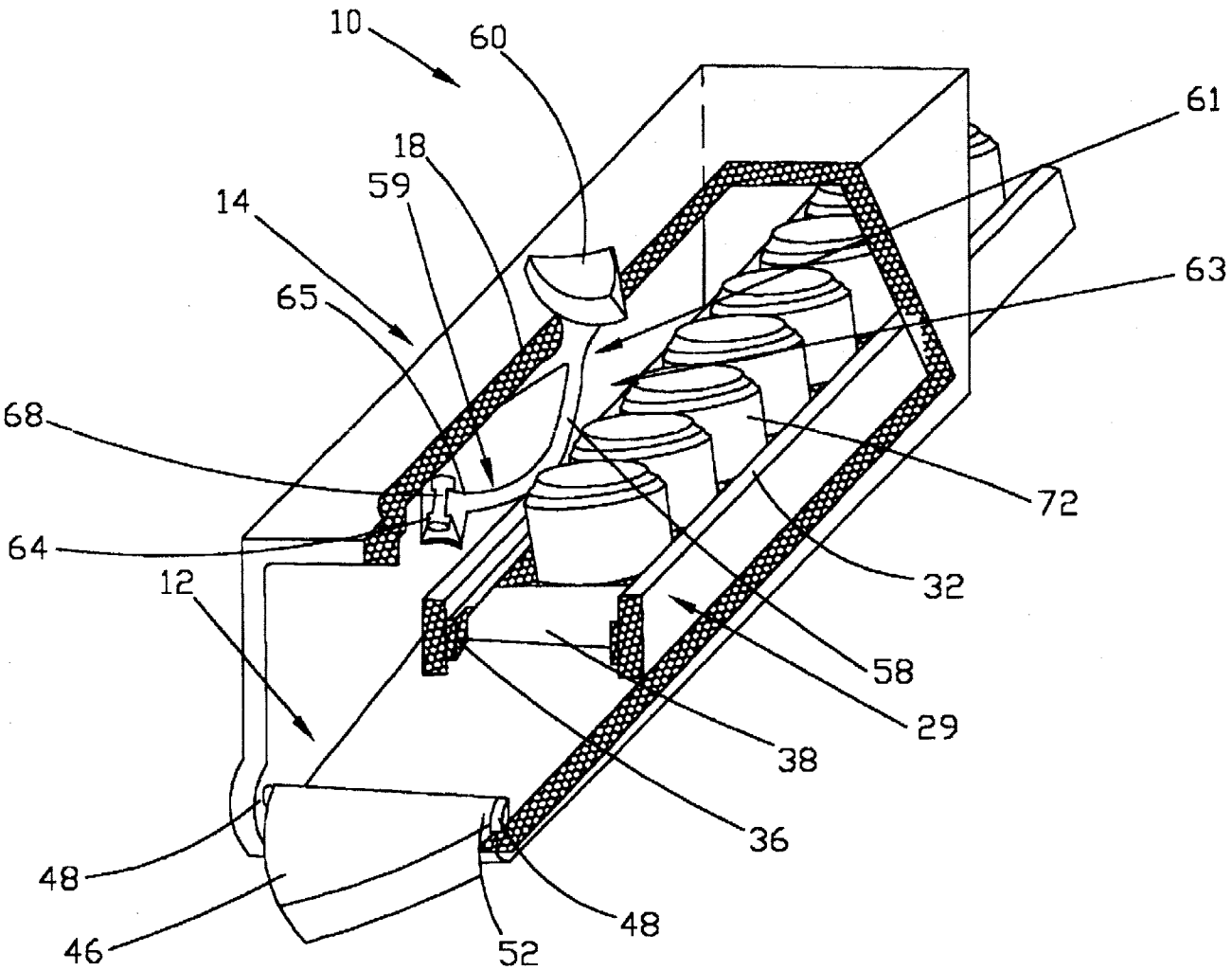
FIG. 16 is a perspective view of the device depicted in FIG. 2 with an alternative rear loading capability, showing the cartridge loading into the shell, shown in partial cutaway.
Figure 17:
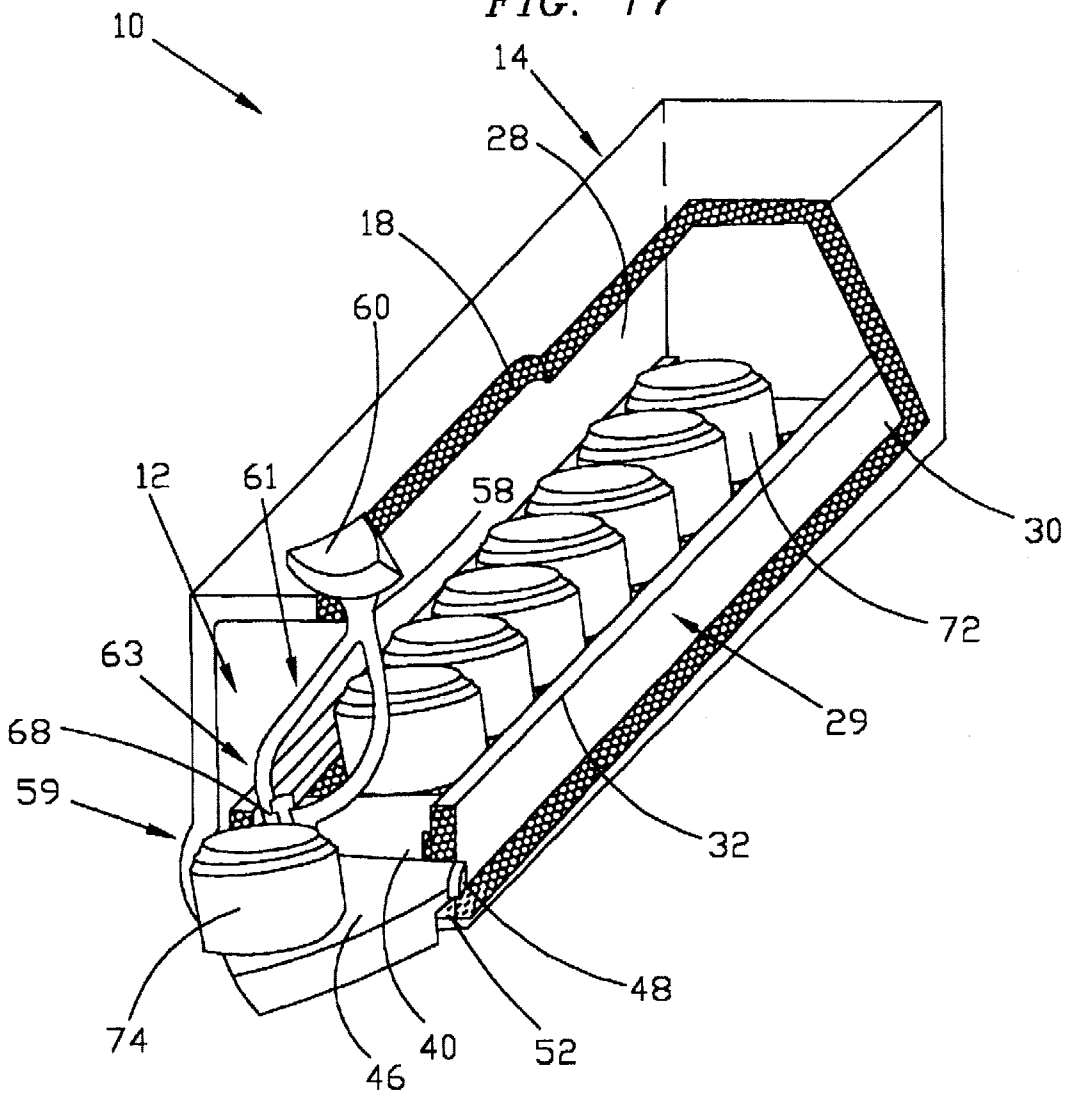
FIG. 17 is a perspective view of the device depicted in FIG. 2 including alternative guiderails, in a second stage of operation, shown in partial cutaway.

FIG. 15 shows a preferred storage position, wherein the advancement arm 58 locks in place and the perch 46 flips upward in a position covering the dispenser opening 12.

Figure 11:
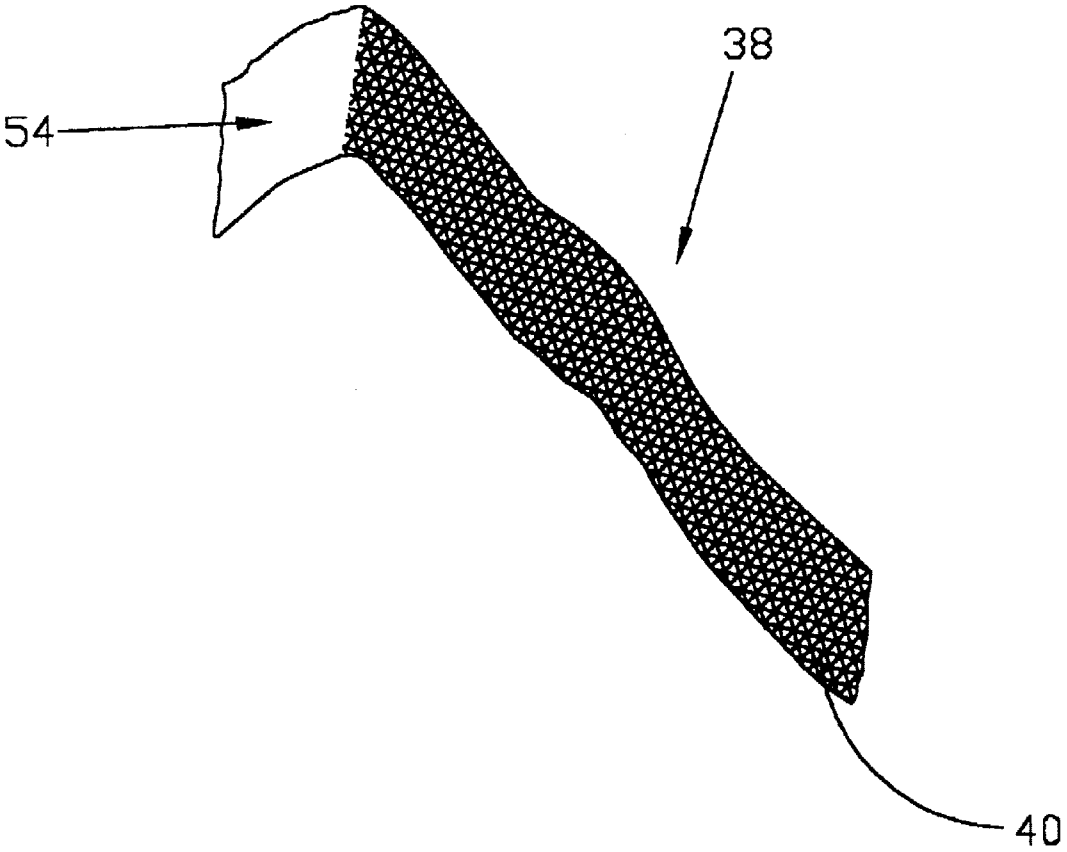
FIG. 11 is a perspective view of an alternative cartridge belt.
Figure 18:
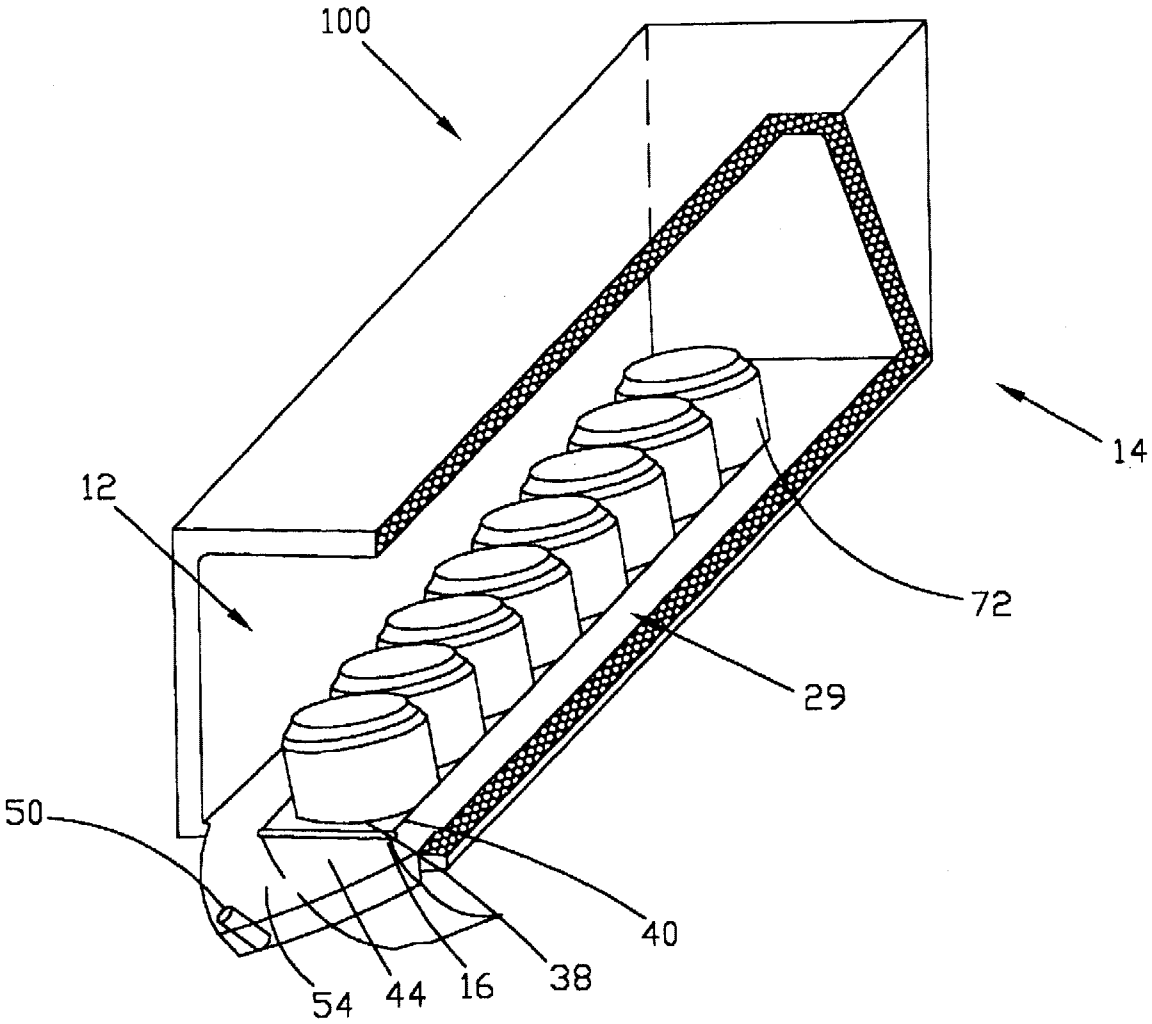
FIG. 18 is a perspective view of an alternative embodiment of the device, shown in partial cutaway.
Figure 19:
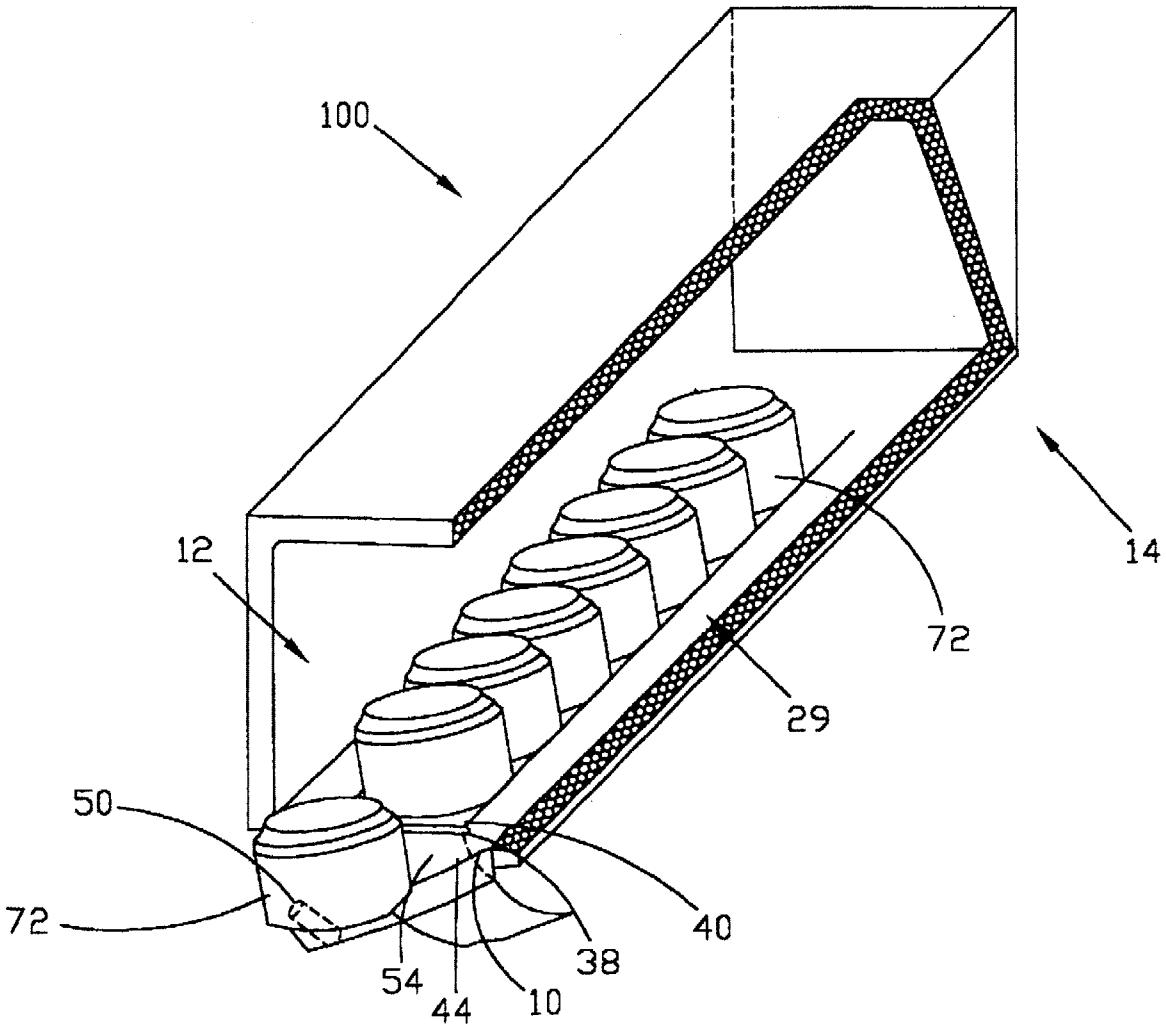
FIG. 19 is a perspective view of the device depicted in FIG. 18 with an object displaced for deployment, shown in partial cutaway.

Those of ordinary skill in the art will appreciate the fact that the invention so far disclosed can and will vary without departing from the scope of the invention. For example, FIG. 18 shows an alternate embodiment of the device 100 which differs from the embodiment previously disclosed in the following manner. The device 100 includes a generally hollow shell 14 with a dispenser opening 12. The shell 14 differs most notably from the previous embodiment, in that the shell 14 contains no advancement slot. Additionally, the device 100 includes a cartridge belt 38, including an adhesive surface 40 for containing the object 72. The cartridge belt 38 lies within the generally hollow interior cavity of the shell 14 and is positioned for removable containment therein. The cartridge belt 38 depicted in FIG. 11 comprises a segmented belt in contrast to the continuous cartridge belt 38 shown elsewhere. The cartridge belt 38, with the adhesive surface 40, (also depicted in FIG. 11) includes a free end 54. The free end 54 fits through a dispenser strip slot 16. The device 100 also includes a perch 44, preferably fixed, engaged with the shell 14 at the dispenser opening 12. The perch 44 includes a magnetic insert 50 capable of magnetic engagement with the objects 72 upon advancement of the objects 72 from the adhesive surface 40 of the cartridge belt 38 onto the perch 44. Advancement of the object 72 is accomplished by applying a force to the free end 54 of the cartridge belt 38 thereby advancing the object 72 onto the perch 44 and in contact with the magnetic insert 50, in the manner shown in FIG. 19. The object 72 held in magnetic engagement with the perch 44 is ready for insertion into its designated receptacle in the manner previously described.

Figure 20:
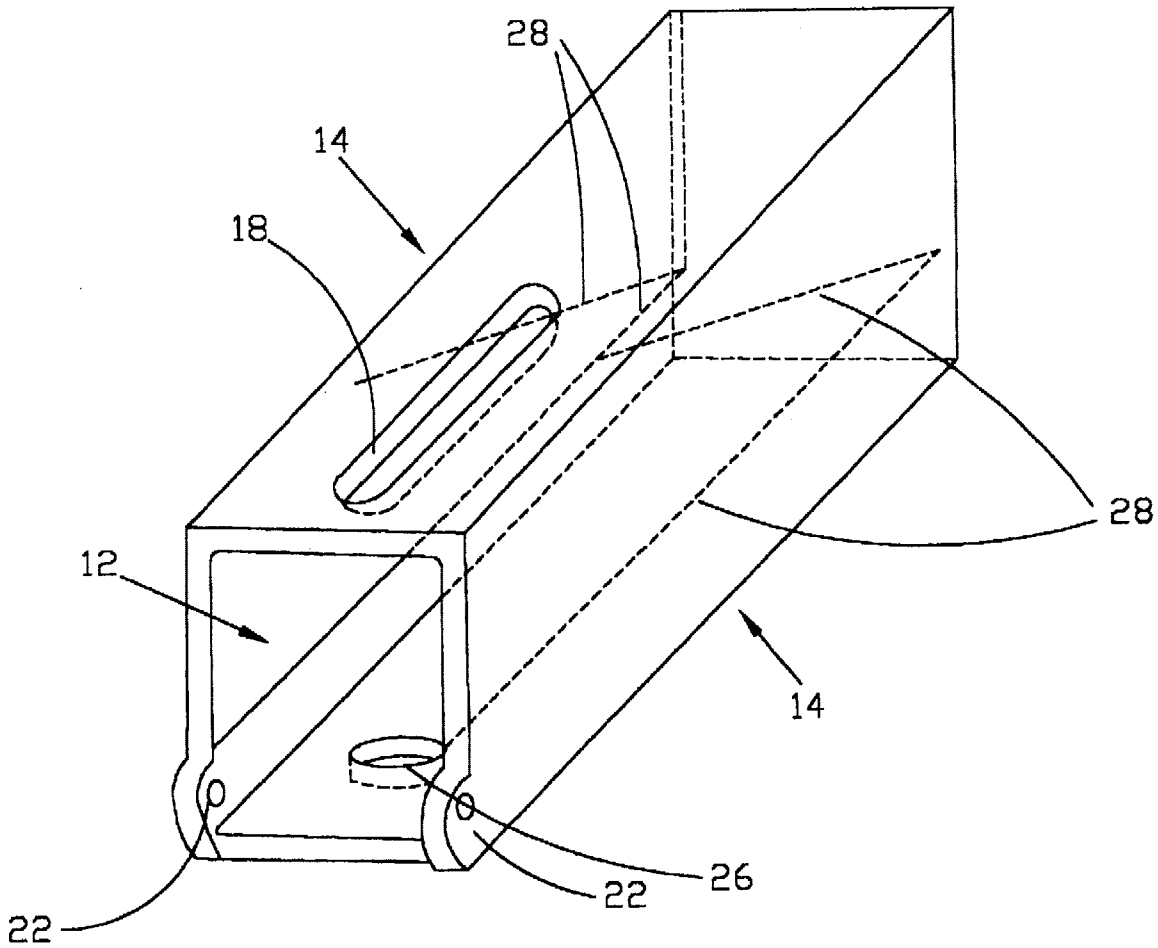
FIG. 20 is a perspective view of an alternative shell showing a cartridge ejection hole and guiderails.

FIG. 20 shows another alternative contemplated herein. In FIG. 20 a shell 14 includes an ejection hole 26, in the form of a generally round hole in the bottom of the shell 14. Operation utilizing the shell 14 generally follows the procedures described herein and above, except that the cartridge plate 30 may be ejected or displaced through upward pressure on the cartridge plate 30 applied by a pencil or other object tool (not shown) inserted through the ejection hole 26.

The embodiment of the shell 14 shown in FIG. 20 also shows another alternative design involving the user of guiderails 28. The guiderails 28 comprise inwardly extending ridges or protrusions that extend along the entire longitudinal axis of the shell 14. The guiderails 28 provide further releasable containment of the cartridge 29. Additionally, the guiderails 28 work particularly well with rear-loading embodiments of the shell 14, wherein the shell 14 further comprises a cartridge insertion opening 104 like those shown in FIGS. 16 and 28a. The cartridge insertion opening 104 is located opposite to the dispenser opening 12 and allows for rear insertion and removal of the cartridge 29.

Referring to FIG. 20, the guiderails 28 actually comprise a narrowing of the width of the shell 14. The guiderails 28, shown partially in an unbroken line and partially in a double dashed phantom lines in FIG. 20, represent a break in the sides of the shell 14. Above the guiderails 28 the width of the shell 14 is thicker than below the guiderails 28. This forms a ridge or shelf to contain the cartridge 29. Also, diagonal single dashed phantom lines in FIG. 20 show that the rearward sections of the guiderails 28 comprise an inwardly extended triangular portion. In other words, the intersection of the single dashed and double dashed phantom lines shown in FIG. 20 represents a generally triangular point that serves to guide a front loaded cartridge 29 downward into the ridge or shelf formed on the shell 14 by the guiderails 28.

Figure 28A:
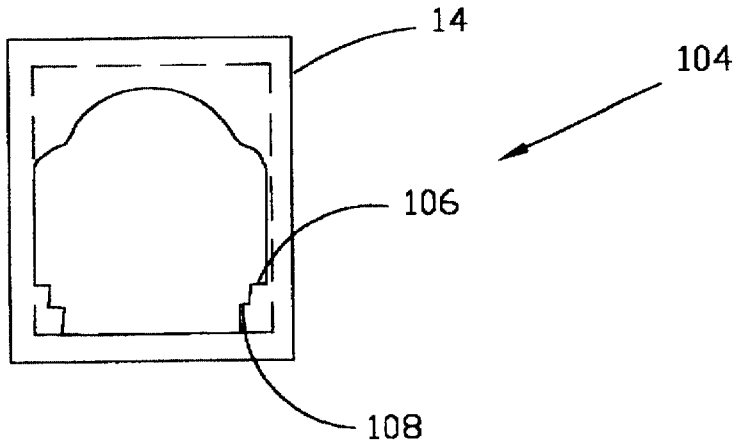
FIG. 28a is a rear side view of a rear opening in an alternative shell for the device depicted in FIG. 1.
Figure 28B:
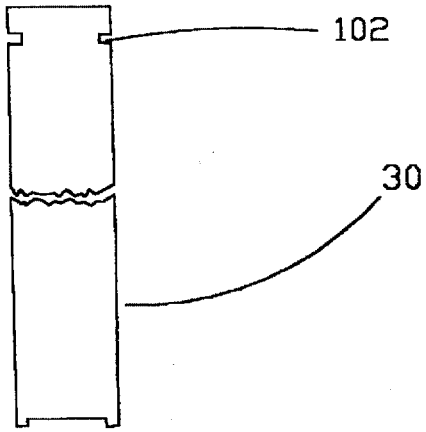
FIG. 28b is a top plan view of an alternative cartridge for the device depicted in FIG. 16.

Furthermore, in the embodiment shown in FIGS. 28a, and 28b, the cartridge *plate* 30 also includes a notched flange 102 designed for capture between the mated upper shoulder 106 and the lower shoulder 108 of the rear insertion opening 104. In this manner, the cartridge *plate* 30 inserts through the rear insertion opening 104. The notched flange 102 straddles the upper shoulder 106, while the lower portion of the cartridge *plate* 30 rests on top of the lower shoulder 108. Additionally, the upper portion of the rear insertion opening 104 is rounded to better provide clearance for the rounded tops of the objects 72. An additional enhancement of this embodiment of the shell 14 includes tapering the guiderails 28 in an upward arch, from the end opposite to the insertion opening 104. This allows for easy insertion of the cartridge 29, and for guiding the cartridge downward during insertion.

Figure 21:
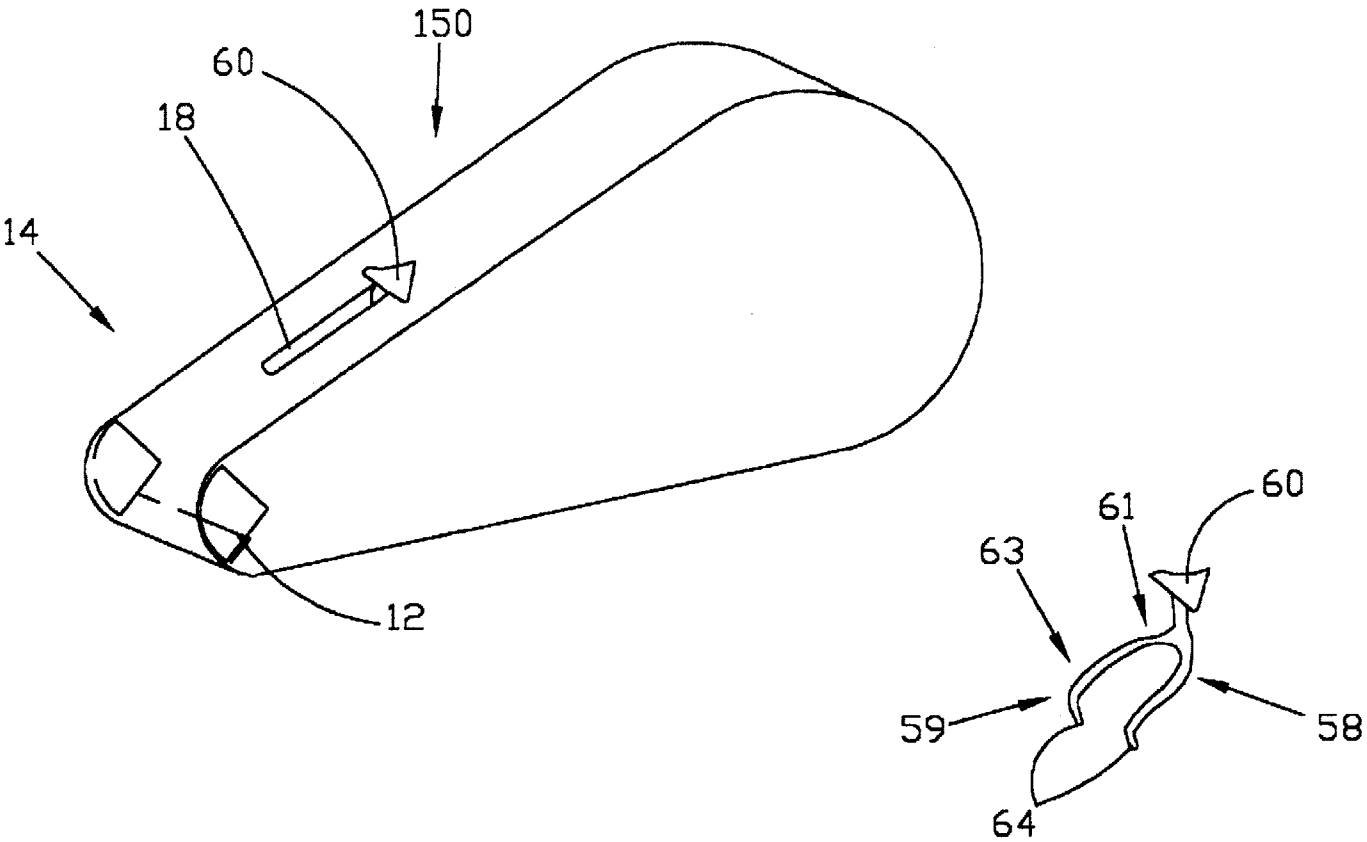
FIG. 21 is a perspective view of an additional alternative device and advancement arm.
Figure 22:
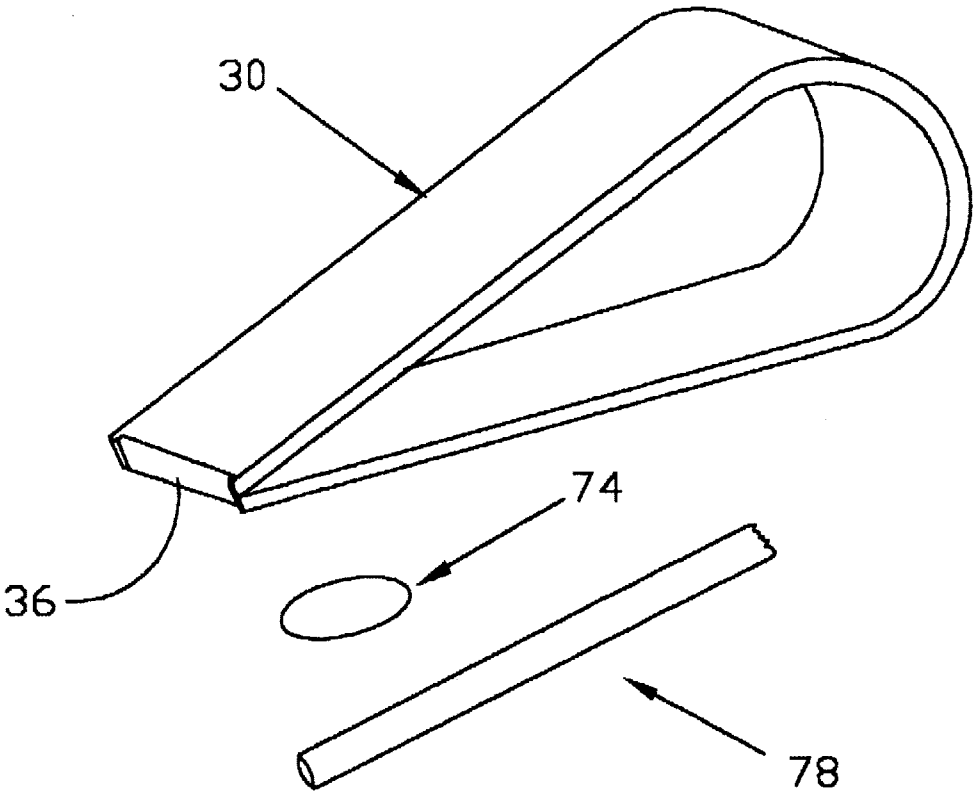
FIG. 22 is a perspective view of the cartridge plate of the device depicted in FIG. 21 including a tablet and a piece of wire solder.
Figure 23:
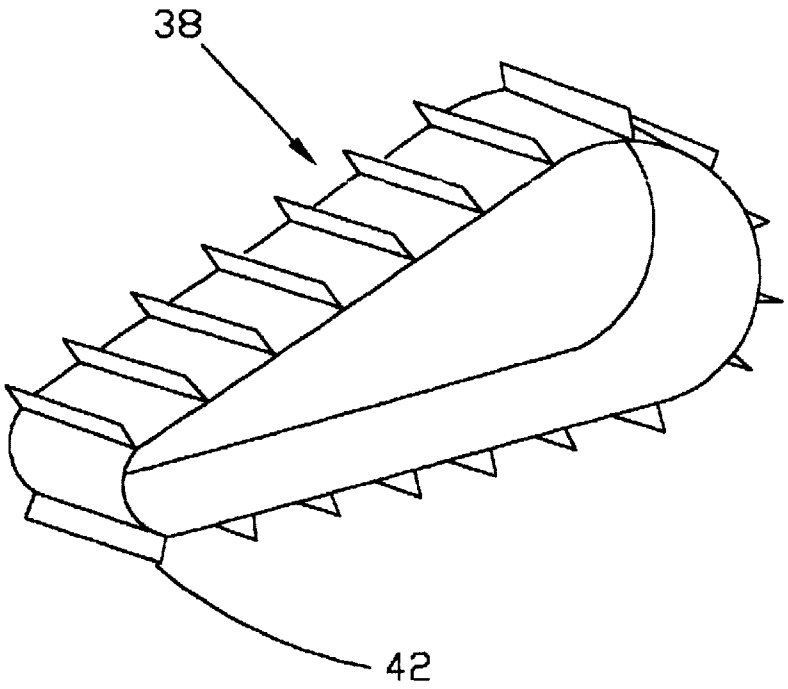
FIG. 23 is a perspective view of the cartridge bell of the device depicted in FIG. 21.
Figure 24:
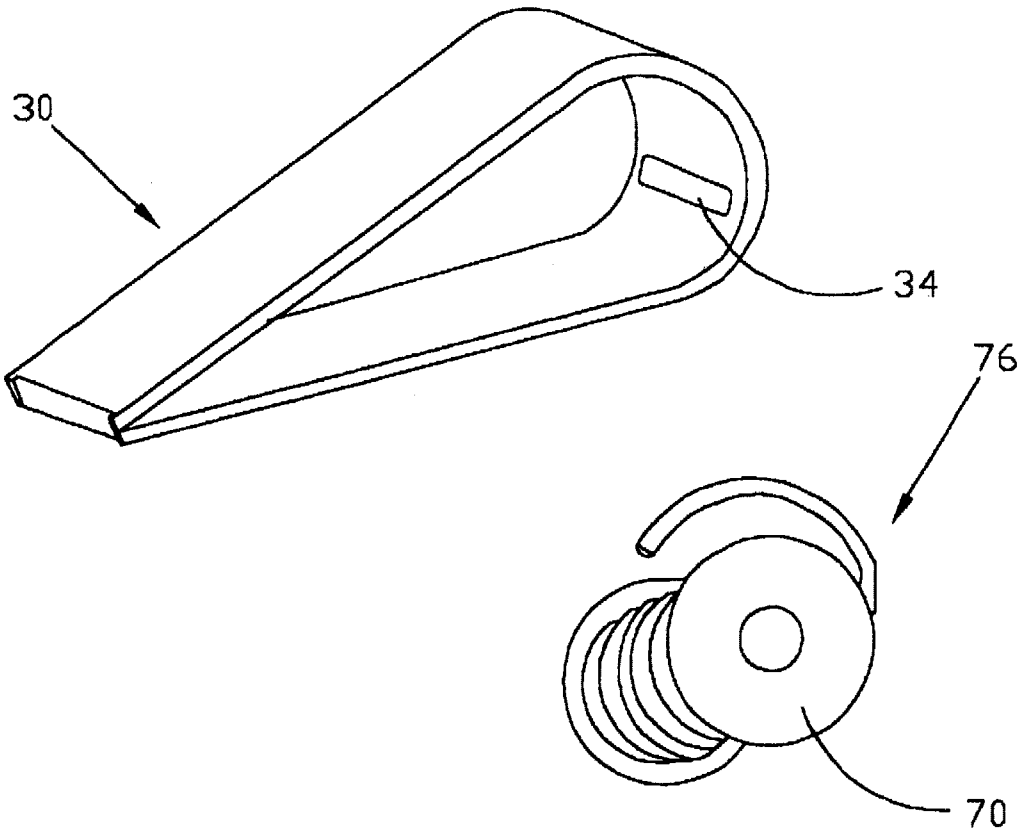
FIG. 24 is a perspective view of a cartridge plate of the device depicted in FIG. 27 and a spool of wire solder.
Figure 25:
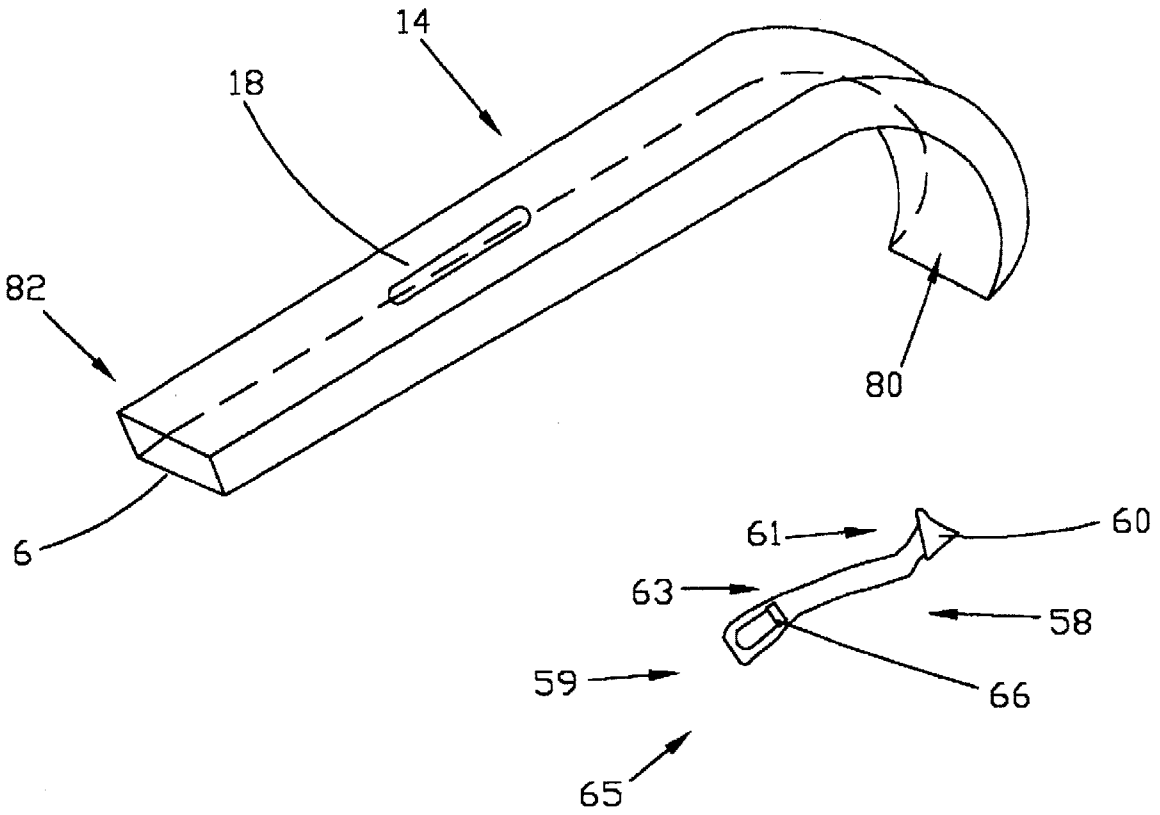
FIG. 25 is a perspective view of a shell and advancement arm of the device depicted in FIG. 27.

FIGS. 21–23 show still another embodiment of the invention, preferably for dispensing tablets 74. FIG. 21 shows a device 150 which includes a shell 14 semi-oval in shape, rather than rectangular. The shell 14, however, despite its shape functions in the same manner described herein-above. The device 150 contains an advancement arm 58 comprised of a double pronged split yoke 63. The double pronged split yoke 63 includes two prongs joined together at the second end 61 of the advancement arm 58, but separated at the first end 59 of the advancement arm 58. Thus the advancement arm 58 includes dual supports 64 for advancement of the objects 74. Additionally, FIG. 22 shows that the device 150 also includes a cartridge plate 30 of a shape similar to the shape of the shell 14, for insertion within the shell 14. The cartridge plate 30 includes a cartridge belt recess notch 36 at a closed end of the cartridge plate 30, opposite to a rounded end of the cartridge plate 30. Disposed about the cartridge plate 30 is a cartridge belt 38 (FIG. 23), also of a shape corresponding to that of the cartridge plate 30 and the shell 14. The cartridge belt 38 includes separators 42 thereby dividing the cartridge belt into individual compartments designed for carrying individual objects 74. The device 150 preferably dispenses individual doses or allotments of objects 74 placed within the shell 14. Advancing the thumb rest 60 of the advancement arm 58 engages the ends of the supports 64 with the separators 42, and advances the cartridge belt 38 upon sliding the advancement arm 58 forward in the advancement slot 18. Sweeping the cartridge belt forward in this manner, captures objects 74 within the compartments created by the separators eventually dispensing the objects 74 from the dispenser opening 12. This embodiment works well with, for example, candies or confectioneries, medicine tablets, vitamins, or any other similarly shaped objects preferably dispensed in an individual manner.

Figure 26:
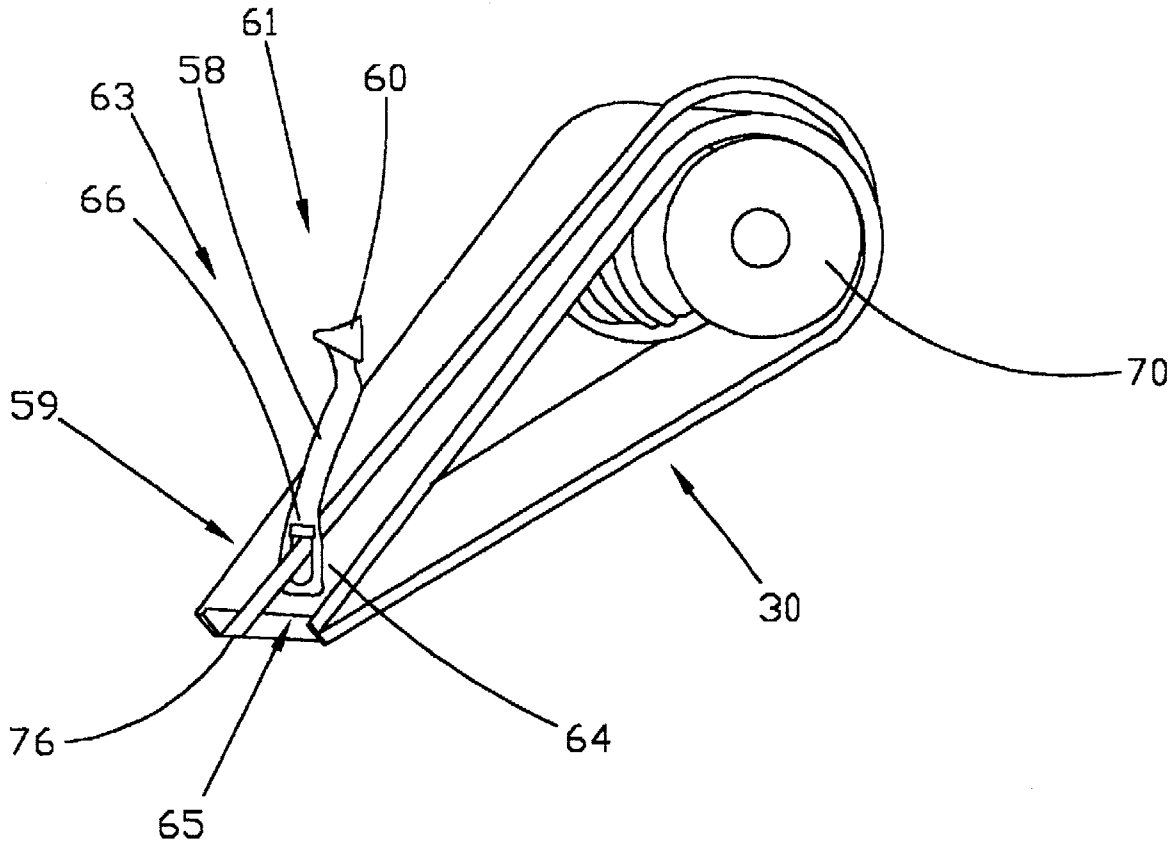
FIG. 26 is a perspective view of the cartridge and advancement arm of the device depicted in FIG. 27 in operation with a spool of wire solder installed.
Figure 27:
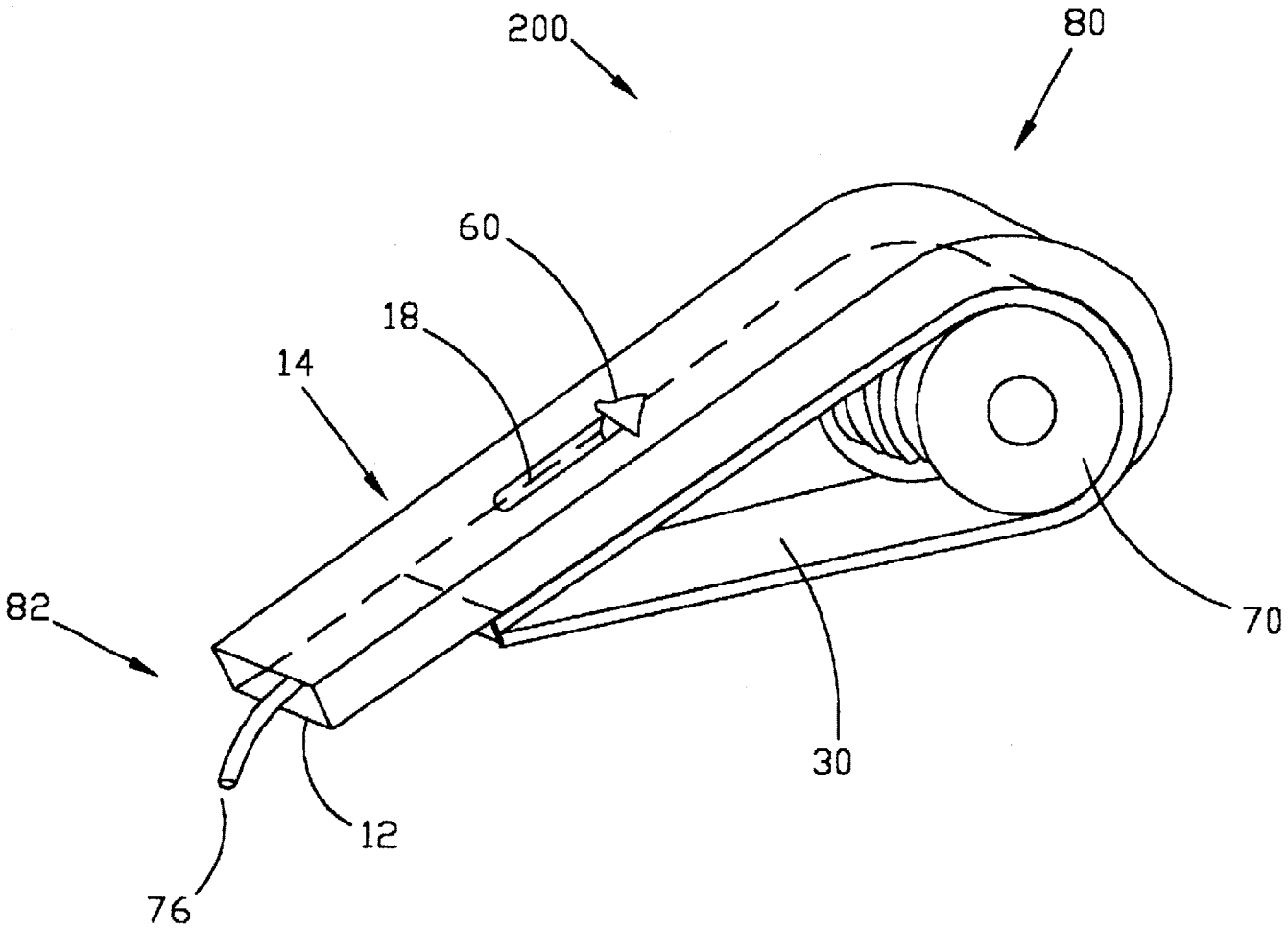
FIG. 27 is a perspective view of a further alternative device.

FIGS. 24–27 show yet another embodiment. In particular, FIG. 27 shows a device 200 comprised of a shell 14 which includes an enclosed generally hollow interior cavity 82 having a dispenser opening 12, and an adjoining partially enclosed portion 80 which includes an advancement slot 18. The device 200 also includes a cartridge plate 30 configured in substantially the same manner as the cartridge plate 30 shown in FIG. 22. The cartridge plate 30 includes a closed rectangular end opposite to a generally open circuit end. The cartridge 30 removably secures within the partially enclosed portion 80 of the shell 14 and also includes a material feed slot 34. The cartridge 30 includes sufficient interior clearance to contain, for example, a spool of solder 70. This allows for feeding the solder 76 through the material feed slot 34, through the partially enclosed portion 80 of the shell 14, and finally into the enclosed generally hollow interior cavity 82 of the shell 14 and out the dispenser opening 12. An advancement arm 58, captureable within the advancement slot 18 of the shell 14, advances the material outward toward and through the dispenser opening 12. The advancement arm 58 includes a second end 61 with a thumb rest 60 to allow for control over the advancement arm 58 in advancing the material towards the dispenser opening 12 during dispensing, and for similar control over the advancement arm 58 in retracting. The advancement arm 58 includes a single piece yoke 63 joining together the first end 59 and send end 61 of the advancement arm 58. Additionally, the first end 59 of the advancement arm 58 includes a base 65 comprised primarily of an object support 64 and an advancement blade 66. FIG. 26 shows that the wire solder 76 passes through an opening in the first end of the advancement arm 58 created between the object support 64 and the advancement blade 66. Thus, downward and forward pressure on the rest 67 of the advancement arm 58 engages the advancement blade 66 with the wire solder 76. Sliding the advancement arm 58 forward in the advancement slot 18 dispenses the wire solder through the dispenser opening 12. In an opposite manner, upward and rearward force applied to the thumb rest 60 of the advancement arm 58 disengages the advancement blade 66 from the wire solder 76 and allows the advancement arm 58 to retract without capturing the solder 76.

The foregoing description and drawing comprise illustrative embodiments of the present invention. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing form the scope of the invention. For example, as shown in FIG. 22 the device 150 can also dispense shrink tubing 78 in a manner similar to that described for dispensing wire solder 76. The present invention avoids the problem of pulling and stretching the shrink tubing 78 experienced with prior devices.

We claim:

1. device for the convenient storage and controlled dispensing of objects, said device comprising:

a) a shell comprising a generally hollow interior cavity, an advancement slot, and a dispenser opening;

b) a cartridge *plate* locatable within said generally hollow interior cavity of said shell and removably contained therein;

c) a cartridge belt disposable *on or* about said cartridge *plate* and capable of receiving the objects for storage and dispensing on said cartridge belt; and d) an advancement arm captureable within said advancement slot of said shell, comprised of a first end for selective advancement of the objects, and a second end to allow control over the advancement arm in advancing the objects toward said dispenser opening for dispensing and for control over the advancement arm in retracting said advancement arm after dispensing.

2. The invention in accordance with claim 1 wherein said cartridge belt is continuously disposed about said cartridge plate.

3. The invention in accordance with claim 1 wherein said cartridge belt further comprises an adhesive surface for the releasable securement of the objects.

4. The invention in accordance with claim 1 wherein said cartridge belt further comprises [Separators] *separators* for the capture of individual objects.

5. The invention in accordance with claim 4 wherein said first end of said advancement arm further comprises a double pronged split-yoke for engaging said separators of said cartridge belt thereby advancing the objects.

6. The invention in accordance with claim 1 wherein said advancement arm slides within said advancement slot of said shell to accomplish said advancing and retracting.

7. The invention in accordance with claim 1 wherein said first end of said advancement arm engages with the objects to accomplish said selective advancement of the objects.

8. The invention in accordance with claim 7 wherein said first end of said advancement arm further comprises a base having a magnetic insert for physical and magnetic engagement with the objects.

9. The invention in accordance with claim 8 wherein said first end of said advancement arm further comprises a split-yoke of sufficient separation to straddle the objects during engagement, said split-yoke lying between said base and said second end of said advancement arm.

10. The invention in accordance with claim 7 wherein said second end of said advancement arm further comprises a locking thumb for releasable engagement with said advancement slot of said shell, and for convenient advancing and retracting when released therefrom.

11. The invention in accordance with claim 1 further comprising a perch engaged with said shell proximate to said dispenser opening for supporting the objects after advancing and during dispensing of the objects.

12. The invention in accordance with claim 11 wherein said perch is hingeably engaged with said shell.

13. The invention in accordance with claim 11 wherein said perch further comprises a magnet for magnetic engagement and support of the objects.

14. The invention in accordance with claim 1 wherein said cartridge further comprises:

a) a cartridge plate wherein said cartridge belt is disposed thereabouts; and b) a pair of side rails disposed on either side of said cartridge plate thereby preventing movement of said cartridge belt in a direction transverse to the direction of advancing.

15. The invention in accordance with claim 1 wherein said shell further comprises a cartridge insertion opening opposite to said dispenser opening for insertion and removal of said cartridge *plate*.

16. The invention in accordance with claim 1 wherein said shell further comprises a pair of retention guides interiorly disposed to releasably contain said cartridge *plate*.

17. The invention in accordance with claim 1 wherein dispenser opening of said shell comprises [a] *an* ejection hole of sufficient diameter to allow for insertion of a tool to eject said cartridge *plate*.

18. A device for the convenient storage and controlled dispensing of objects, said device comprising:

a) a shell comprising a generally hollow interior and a dispenser opening;

b) a cartridge locatable within said generally hollow interior cavity of said shell and removably contained therein;

c) a cartridge belt disposable *on or* about said cartridge *plate* and capable of receiving the objects for storage and dispensing on said cartridge belt, said cartridge belt having a free end wherein a force applied to said free end advances the objects; and d) a perch engaged with said shell proximate to said dispenser opening and having a magnetic insert capable of magnetic engagement with the objects upon advancement of the objects.

[19. A device for the convenient storage and controlled dispensing of a material, said device comprising:

a) a shell comprising an enclosed generally hollow interior cavity having a dispenser opening and a plurality enclosed portion having an advancement slot;

b) a cartridge removably contained within said partially enclosed portion of said shell having a material feed slot, and an open interior for retaining said material to allow for feeding the material through said feed slot; and c) an advancement arm captureable within said advancement slot of said shell, comprised of a first end for selective advancement of the material, and a second end to allow control over the advancement arm in advancing the material toward said dispenser opening for dispensing and for control over the advancement arm in retracting said advancement arm after dispensing.]

20. A method for the convenient storage and dispensing of objects, said method comprising:

a) providing a device comprising:

i) a shell comprising a generally hollow interior cavity, an advancement slot, and a dispenser opening;

ii) a cartridge locatable within said generally hollow interior cavity of said shell;

iii) a cartridge belt disposable about said cartridge *plate*; and iv) an advancement arm captureable within said advancement slot of said shell, comprised of a first end and a second end;

b) storing the objects on said cartridge belt of said cartridge *plate*;

c) inserting for removable containment said cartridge into said generally hollow interior cavity of said shell;

d) advancing the objects with said first end of said advancement arm toward said dispenser opening of said shell through extension of a force on said second end of said advancement arm;

e) dispensing the objects therefrom; and f) retracting said advancement arm through extension of a force on said second end of said advancement arm.

*21. A device for the convenient storage and controlled dispensing of objects, said device comprising:*

*(a) a shell comprising a top, a sidewall and a generally hollow interior cavity, an advancement slot in said top, and a dispenser opening in said sidewall;*

*(b) an object support locatable within said generally hollow interior cavity of said shell and contained therein;*

*(c) said object support being capable of receiving objects for storage and dispensing and including an adhesive material for the releasable securement of said objects; and*

*(d) an advancement member capturably received within said advancement slot of said shell, said advancement member including a first portion for the advancement of the objects and a second portion that allows control over the advancement member in advancing the objects toward said dispenser opening for dispensing and for control over the advancement member in retracting the advancement member after dispensing.*

*22. An invention in accordance with claim 21 wherein said support and said shell are moveable relative to each other.*

*23. An invention in accordance with claim 22 wherein said object support further includes a separate member which supports said adhesive material.*

*24. An invention in accordance with claim 22 wherein said advancement member slides within said advancement slot of said shell to accomplish said advancing and retracting.*

*25. An invention in accordance with claim 22 wherein said objects are zinc air batteries and wherein release of said batteries from said adhesive of said adhesive material initiates activation of said batteries.*

*26. An invention in accordance with claim 21 wherein said object support further includes a separate member which supports said adhesive material.*

*27. An invention in accordance with claim 21 wherein said advancement member slides within said advancement slot of said shell to accomplish said advancing and retracting.*

*28. An invention in accordance with claim 21 wherein said first portion of said advancement member engages with the objects to accomplish said selective advancement of the objects.*

*29. An invention in accordance with claim 21 wherein said device is configured such that said adhesive material and said object are caused to diverge in direction during the dispensing of each said object such that said adhesive material is peeled away from said object during the dispensing operation.*

*30. An invention in accordance with claim 21 wherein said advancement member operates to dispense one object per advancement operation.*

*31. A device for the convenient storage and controlled dispensing of objects, said device comprising:*

*(a) a shell comprising a top, a sidewall and a generally hollow interior cavity, an advancement slot in said top, and a dispenser opening in said sidewall;*

*(b) an object support locatable within said generally hollow interior cavity of said shell and contained therein;*

*(c) said object support being capable of receiving objects for storage and dispensing and including an adhesive material for the releasable securement of said objects;*

*(d) an advancement member capturably received within said advancement slot of said shell, said advancement member including a first portion for the advancement of the objects and a second portion that allows control over the advancement member in advancing the objects toward said dispenser opening for dispensing and for control over the advancement member in retracting the advancement member after dispensing; and*

*(e) a perch engaged with said shell proximate to said dispenser opening for supporting the objects after advancing and during dispensing of the objects.*

*32. An invention in accordance with claim 31 wherein said perch further comprises a magnet for magnetic engagement in support of the objects.*

*33. An invention in accordance with claim 31 wherein said perch is hingedly engaged with said shell.*

*34. An invention in accordance with claim 31 wherein said device is configured such that said adhesive material and said object are caused to diverge in direction during the dispensing of each said object such that said adhesive material is peeled away from said object during the dispensing operation.*

*35. A method for the convenient storage and dispensing of objects, said method comprising:*

*(a) providing a device comprising:*

*(i) a shell comprising a top, sidewall, generally hollow interior cavity, an advancement slot in said top, and a dispenser opening in said sidewall;*

*(ii) an object support locatable within said generally hollow interior cavity and including an adhesive material; and*

*(iii) an advancement member received within said advancement slot of said shell, said advancement member including a first portion and a second portion;*

*(b) storing the objects on said adhesive material of said object support;*

*(c) inserting said object support into said generally hollow interior cavity of said shell;*

*(d) advancing the objects with said first portion of said advancement member toward said dispenser opening of said shell through exertion of a force of said second portion of said advancement member;*

*(e) dispensing the objects therefrom; and*

*(f) retracting said advancement member through exertion of a force on said second portion of said advancement member.*

*36. A method as in claim 35, wherein said object support comprises a separate adhesive-carrying member and wherein said shell and said object support are moveable relative to each other, said method comprising the step of causing said adhesive-carrying member and said shell to move relative to each other prior to the dispensing of each of said objects.*

*37. A method as in claim 36 including the step of causing said adhesive carrying member and each said object to diverge in direction during the dispensing of each said object such that said adhesive carrying member is peeled away from said object.*

* * * * *

UNITED STATES PATENT AND TRADEMARK OFFICE

CERTIFICATE OF CORRECTION

PATENT NO. : RE 38,368 E
DATED : December 30, 2003
INVENTOR(S) : Lewis D. Bishop and Lawrence Bishop It is certified that error appears in the above-identified patent and that said Letters Patent is hereby corrected as shown below:

Column 16,
Line 12, delet the word "extension" and insert -- exertion --; and
Line 15, delete the word "extension" and insert -- exertion --.

Signed and Sealed this

Thirteenth Day of April, 2004

JON W. DUDAS
*Acting Director of the United States Patent and Trademark Office*